US012292750B2

(12) United States Patent
Noboa et al.

(10) Patent No.: US 12,292,750 B2
(45) Date of Patent: *May 6, 2025

(54) HVAC SYSTEM WITH DATA DRIVEN USER INTERFACE FOR EQUIPMENT COMMISSIONING AND OPERATION

(71) Applicant: Tyco Fire & Security GmbH, Schaffhausen (CH)

(72) Inventors: Homero L. Noboa, Waukesha, WI (US); Kirk H. Drees, Cedarburg, WI (US); Vivek V. Gupta, Shorewood, WI (US); Mark T. Fischbach, New Berlin, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,106

(22) Filed: Jan. 29, 2024

(65) Prior Publication Data
US 2024/0168503 A1    May 23, 2024

Related U.S. Application Data

(63) Continuation of application No. 17/581,670, filed on Jan. 21, 2022, now Pat. No. 11,886,209, which is a
(Continued)

(51) Int. Cl.
*G05D 23/19* (2006.01)
*F24F 11/30* (2018.01)
(Continued)

(52) U.S. Cl.
CPC .......... *G05D 23/1917* (2013.01); *F24F 11/30* (2018.01); *F24F 11/62* (2018.01);
(Continued)

(58) Field of Classification Search
CPC ............ G05D 23/1917; G05D 23/1904; F24F 11/006; F24F 11/0086; F24F 2011/0091;
(Continued)

(56) References Cited

U.S. PATENT DOCUMENTS 4,982,573 A    1/1991   Tatematsu et al.
5,271,045 A    12/1993  Scarola et al.
(Continued)

FOREIGN PATENT DOCUMENTS

CA    2957726 A1    3/2016
CA    3043996 A1    2/2018
(Continued)

OTHER PUBLICATIONS

CoolingLogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).
(Continued)

*Primary Examiner* — Robert E Fennema
*Assistant Examiner* — Olvin Lopez Alvarez
(74) *Attorney, Agent, or Firm* — Foley & Lardner LLP

(57) ABSTRACT

A building management system (BMS) operates a plurality of HVAC devices to affect a physical state or condition and detects a fault condition at a second HVAC device affected by the physical state or condition and having causal relationships with the plurality of HVAC devices such that faulty operation of one or more of the plurality of HVAC devices causes a detectable effect at the second HVAC device. The BMS identifies, based on the fault condition, a predetermined set of system parameters corresponding to the fault condition and comprising a plurality of system parameters of the plurality of HVAC devices that are potential causes of the fault condition. The BMS retrieves operating data for the predetermined set of system parameters and transmits a
(Continued)

signal to display a user interface comprising the operating data on a display screen.

20 Claims, 16 Drawing Sheets

Related U.S. Application Data continuation of application No. 15/668,264, filed on Aug. 3, 2017, now Pat. No. 11,237,576.

(51) Int. Cl.
*F24F 11/62* (2018.01)
*G05B 23/02* (2006.01)
*G06F 3/0484* (2022.01)
*F24F 11/52* (2018.01)

(52) U.S. Cl.
CPC ..... *G05B 23/0267* (2013.01); *G05D 23/1904* (2013.01); *G06F 3/0484* (2013.01); *F24F 11/52* (2018.01)

(58) Field of Classification Search
CPC .. F24F 11/30; F24F 11/62; F24F 11/52; G06F 3/0481
See application file for complete search history.

(56) References Cited

U.S. PATENT DOCUMENTS

| | | | |
|---|---|---|---|
| 5,287,390 | A | 2/1994 | Scarola et al. |
| 5,581,242 | A | 12/1996 | Arita et al. |
| 5,651,264 | A * | 7/1997 | Lo ............................ F24F 11/30 236/78 D |
| 7,496,472 | B2 | 2/2009 | Seem |
| 8,135,481 | B2 | 3/2012 | Blevins et al. |
| 9,355,477 | B2 | 5/2016 | Ashley et al. |
| 9,447,985 | B2 | 9/2016 | Johnson |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2003/0093186 | A1 | 5/2003 | Patterson et al. |
| 2007/0067062 | A1 | 3/2007 | Mairs et al. |
| 2007/0078526 | A1 | 4/2007 | Bromley et al. |
| 2008/0082194 | A1 | 4/2008 | Samardzija et al. |
| 2008/0179408 | A1 | 7/2008 | Seem |
| 2010/0070907 | A1 | 3/2010 | Harrod et al. |
| 2010/0324741 | A1 | 12/2010 | House et al. |
| 2011/0047418 | A1 | 2/2011 | Drees et al. |
| 2011/0087988 | A1 | 4/2011 | Ray et al. |
| 2011/0088000 | A1 | 4/2011 | Mackay |
| 2011/0137853 | A1 | 6/2011 | Mackay |
| 2011/0153039 | A1 | 6/2011 | Gvelesiani et al. |
| 2012/0022700 | A1 | 1/2012 | Drees et al. |
| 2012/0259583 | A1 | 10/2012 | Noboa et al. |
| 2013/0060385 | A1 | 3/2013 | Leen et al. |
| 2013/0197698 | A1 | 8/2013 | Shah et al. |
| 2013/0339080 | A1 | 12/2013 | Beaulieu et al. |
| 2014/0026598 | A1 | 1/2014 | Trawicki et al. |
| 2014/0108985 | A1 | 4/2014 | Scott et al. |
| 2014/0222394 | A1 | 8/2014 | Drees et al. |
| 2014/0282458 | A1 | 9/2014 | Gupta |
| 2015/0227404 | A1 | 8/2015 | Rajagopal et al. |
| 2015/0292985 | A1 | 10/2015 | Yenni et al. |
| 2015/0316902 | A1 | 11/2015 | Wenzel et al. |
| 2015/0338133 | A1 | 11/2015 | Havard et al. |
| 2015/0338160 | A1 | 11/2015 | Park et al. |
| 2016/0054712 | A1 | 2/2016 | McFarland et al. |
| 2016/0103457 | A1 | 4/2016 | Maughan et al. |
| 2016/0116177 | A1 | 4/2016 | Sikora et al. |
| 2016/0131388 | A1 | 5/2016 | Eiynk |
| 2016/0140429 | A1 | 5/2016 | Glosser et al. |
| 2016/0180220 | A1 | 6/2016 | Boettcher et al. |
| 2016/0203036 | A1 | 7/2016 | Mezic et al. |
| 2016/0209074 | A1 | 7/2016 | Ito et al. |
| 2016/0215996 | A1 | 7/2016 | Blair et al. |
| 2016/0328945 | A1 | 11/2016 | Greisser et al. |
| 2016/0366010 | A1 | 12/2016 | Hamber et al. |
| 2017/0038945 | A1 | 2/2017 | Beaulieu et al. |
| 2017/0241657 | A1 | 8/2017 | Salsbury et al. |
| 2017/0286204 | A1 | 10/2017 | Dibowski et al. |
| 2017/0321923 | A1 | 11/2017 | Wiens-Kind et al. |
| 2018/0076978 | A1 | 3/2018 | Schubert et al. |
| 2018/0209675 | A1 | 7/2018 | Ridder |
| 2018/0224144 | A1 | 8/2018 | Noboa et al. |
| 2018/0224819 | A1 | 8/2018 | Noboa |
| 2018/0225244 | A1 | 8/2018 | Dorneanu et al. |

FOREIGN PATENT DOCUMENTS

| | | |
|---|---|---|
| EP | 2 216 701 A1 | 8/2010 |
| EP | 3 186 687 A4 | 7/2017 |
| EP | 3 497 377 A1 | 6/2019 |

OTHER PUBLICATIONS

Honeywell, ComfortPoint Open Building Management System: Apr. 2013, p. 8. Downloaded from the internet https://buildingsolutions.honeywell.com/en-US/newsevents/resources/Publications/honeywell-hbs-comfortpoint-open%20bms-consultant%20specifier-brochure.pdf (Year: 2013).

Honeywell, "ComfortPoint Open", Mar. 2017, pp. 15, downloaded from the internet https://buildingsolutions.honeywell.com/en-US/newsevents/resources/Publications/SL-53-2444%20CPO%20Technical%20and%20Guide%20Specification.pdf (Year: 2017).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

(56) References Cited

OTHER PUBLICATIONS

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Salsbury et al, "Fault Detection in HVAC Systems Using Model-Based Feedforward Control," 2001 (pp. 1-22).

Yan et al., "Chiller Plant Fault Diagnosis Considering Fault Propagation," 2015, downloaded from https://ieeexplore.ieee.org/stamp/stamp.jsp?arnumber=7385977 (6 pages).

* cited by examiner

HVAC SYSTEM WITH DATA DRIVEN USER INTERFACE FOR EQUIPMENT COMMISSIONING AND OPERATION

CROSS-REFERENCE TO RELATED PATENT APPLICATION

This application is a continuation of U.S. patent application Ser. No. 17/581,670 filed Jan. 21, 2022, which is a continuation of U.S. patent application Ser. No. 15/668,264 filed Aug. 3, 2017, the entire disclosure of which is incorporated by reference herein.

BACKGROUND

The present disclosure relates generally to the field of heating, ventilation and air conditioning (HVAC) control systems. The present disclosure relates more particularly to systems and methods for data driven user interfaces for equipment commissioning and operation.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a master controller for receiving feedback from the measurement devices and providing a control signal to the control devices. In many instances, the HVAC control system includes a PC-based interface that is used to view plant information.

When an abnormal situation occurs during the operation of an HVAC system, for example, during the operation of a chiller plant within the HVAC system, current methods exist to detect the fault and notify an operator of its existence (e.g., lights, flags, emails, text messages). However, once notified of the fault, the system operator is often required to navigate through many screens of dense information to determine the full scope of the anomaly and to execute an appropriate remedial course of action. Systems that map fault conditions to relevant system parameters and then display the collected information in a dynamic user interface, permitting an operator to easily view and modify the system parameters, would be useful.

SUMMARY

One embodiment of the present disclosure relates to a building management system. The building management system includes a communications interface connected to HVAC devices, a device identifier configured to identify the HVAC devices, a fault detector configured to detect a fault condition in the identified devices, and a causal relationship template retriever configured to retrieve a fault causation template of system parameters specific to the fault condition. The building management system further includes a status requestor configured to retrieve operating data from the identified devices and a user interface generator. The user interface generator is configured to populate the system parameters of the fault causation template with the retrieved operating data and transmit a signal to display a user interface with the populated fault causation template on a display screen.

In some embodiments, the building management system includes a state identifier configured to determine an operating state of at least one of the identified devices. In other embodiments, the operating state is at least one of an alarm state, a cooling state, a heating state, a commissioning state, and a standby state.

In some embodiments, the display screen is a chiller device display screen. In other embodiments, the display screen is a user computing device display screen.

In some embodiments, the HVAC devices connected to the communications interface include at least one of an air handling unit, an economizer-type air handling unit, a variable air volume unit, a rooftop unit, a damper, an actuator, a fan, a pump, a valve, and a thermostat.

In some embodiments, the system parameters specific to the fault condition include at least one of a valve position, a damper position, a pump status, an actuator status, an air flow rate, a water supply temperature, an outdoor air temperature, and a fan percent command.

In some embodiments, the user interface with the populated fault causation template includes a hyperlink that opens a user interface configured to modify at least one of the system parameters. In other embodiments, the user interface with the populated fault causation template includes a hyperlink that opens a user interface configured to display historical data associated with at least one of the system parameters.

Another embodiment of the present disclosure relates to a method of creating a data driven user interface for a building management system. The method includes identifying, by a device identifier, HVAC devices connected to a communications interface and detecting, by a fault detector, a fault condition in at least one of the identified devices. The method further includes retrieving, by a causal relationship template retriever, a fault causation template with system parameters specific to the fault condition and retrieving, by a status requestor, operating data from the identified devices. The method additionally includes populating, by a user interface generator, the system parameters of the fault causation template with the retrieved operating data from the identified devices and transmitting a signal to display a user interface with the populated causation template on a display screen.

In some embodiments, the display screen is a chiller device display screen. In other embodiments, the display screen is a user computing device display screen.

In some embodiments, the HVAC devices connected to the communications interface include at least one of an air handling unit, an economizer-type air handling unit, a variable air volume unit, a rooftop unit, a damper, an actuator, a fan, a pump, a valve, and a thermostat.

In some embodiments, the system parameters specific to the fault condition include at least one of a valve position, a damper position, a pump status, an actuator status, an air flow rate, a water supply temperature, an outdoor air temperature, and a fan percent command.

In some embodiments, the user interface with the populated fault causation template includes a hyperlink that opens a user interface configured to modify at least one of the system parameters. In other embodiments, the user interface with the populated fault causation template includes a hyperlink that opens a user interface configured to display historical data associated with at least one of the system parameters.

Another embodiment of the present disclosure relates to a chilled water plant. The chilled water plant includes a communications bus and chilled water plant devices connected to the communications bus. The chilled water plant devices include at least one of a chiller device, a cooling tower, a chilled water pump, a condenser water pump, and an isolation valve. The chilled water plant further includes a chiller device connected to the communications bus. The chiller device includes a processing circuit configured to identify the chilled water plant devices connected to the communications bus, detect a fault condition in at least one of the identified devices, retrieve a fault causation template with chilled water plant parameters specific to the fault condition, and retrieve operating data from the identified devices. The processing circuit is further configured to populate the fault causation template with the retrieved operating data from the identified devices and to transmit a signal to display a user interface with the populated fault causation template on a display screen of the chiller device.

In some embodiments, the processing circuit of the chiller device is further configured to determine an operating state of at least one of the identified devices. In some embodiments, the operating state is at least one of an alarm state, a commissioning state, and a standby state.

DETAILED DESCRIPTION

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, data driven user interfaces for HVAC equipment commissioning and operation. The HVAC equipment may operate within a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The data driven user interfaces described herein permit a user to easily navigate and modify the operating conditions of HVAC equipment within a BMS. To create a data driven user interface, a controller or supervisory device sends a query message to detect all devices connected to a network within the BMS. In some embodiments, the query message is sent as part of a commissioning process. Upon detection of the devices connected to the network, a commissioning agent (e.g., a controller, a supervisory device) can map the discovered devices to templates pre-populated with configuration parameter values for the discovered devices. In other embodiments, the BMS is fully operational and a controller or supervisory device detects a fault condition. In response to the detection of the fault condition, the controller or supervisory device identifies all devices that may be the cause of the fault condition and retrieves operating data from the identified devices. This operating data, also known as "fault causation data," is utilized to populate a "fault causation template" that include all data relevant to a given fault condition. In both the commissioning and troubleshooting scenarios, by displaying the populated template as a user interface on a display panel (e.g., a smart chiller display) or a computing device (a mobile phone, a laptop), a user is able to navigate between the parameters relevant to the commissioning or troubleshooting process and is not required to view or navigate through any extraneous information. By clicking on hyperlinks within the user interface, the user is able to open parameter value history windows that plot the historical trends of parameter values, and parameter value modification windows that permit a user to modify system parameters in a way that may resolve or mitigate a fault condition.

Building Management System and HVAC System

Figure 1:
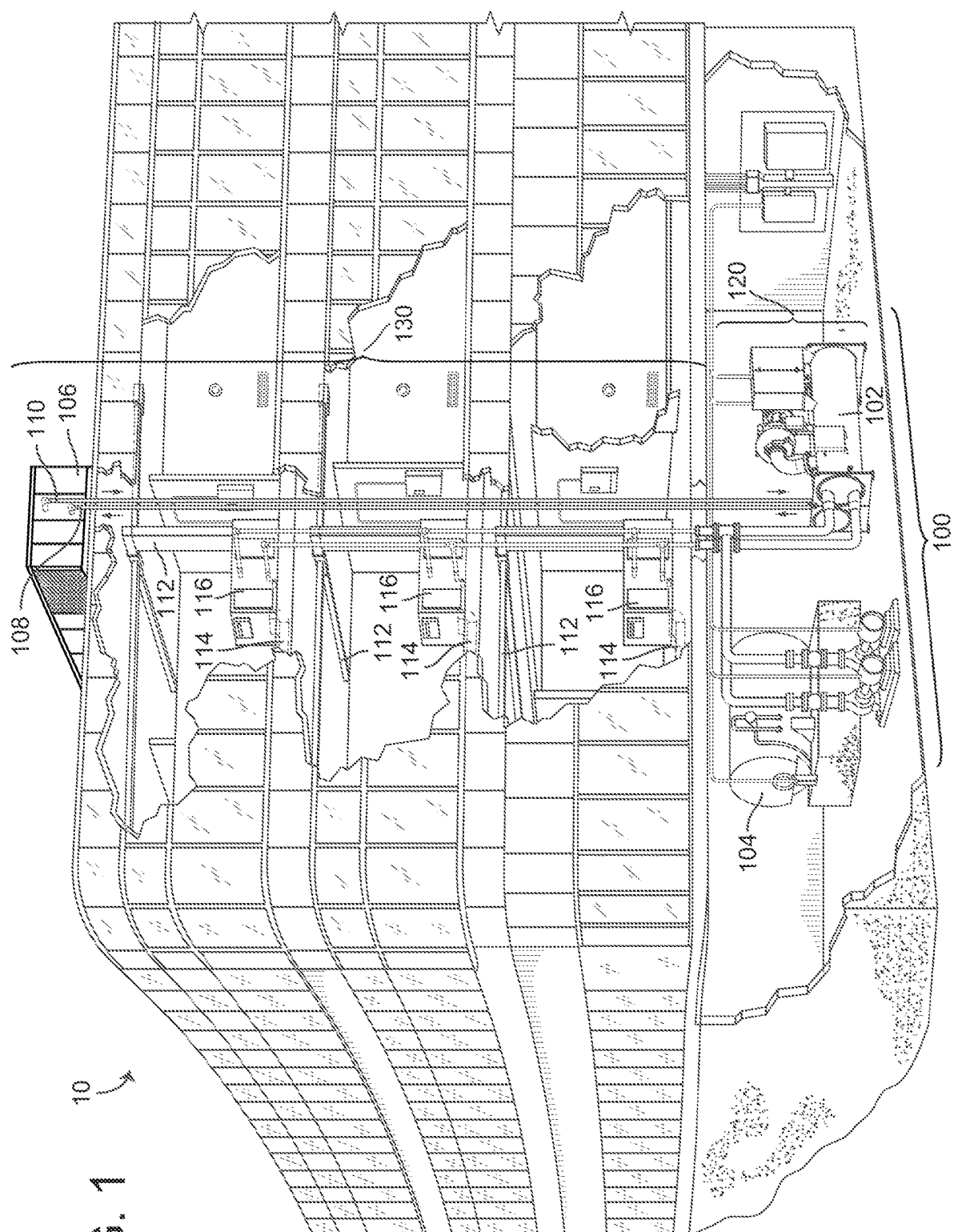
FIG. 1 is a drawing of a building equipped with a heating, ventilating, and air conditioning (HVAC) system and a building management system (BMS), according to some embodiments.

Referring now to FIGS. 1-4, an exemplary building management system (BMS) and HVAC system in which the systems and methods of the present invention can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2A:
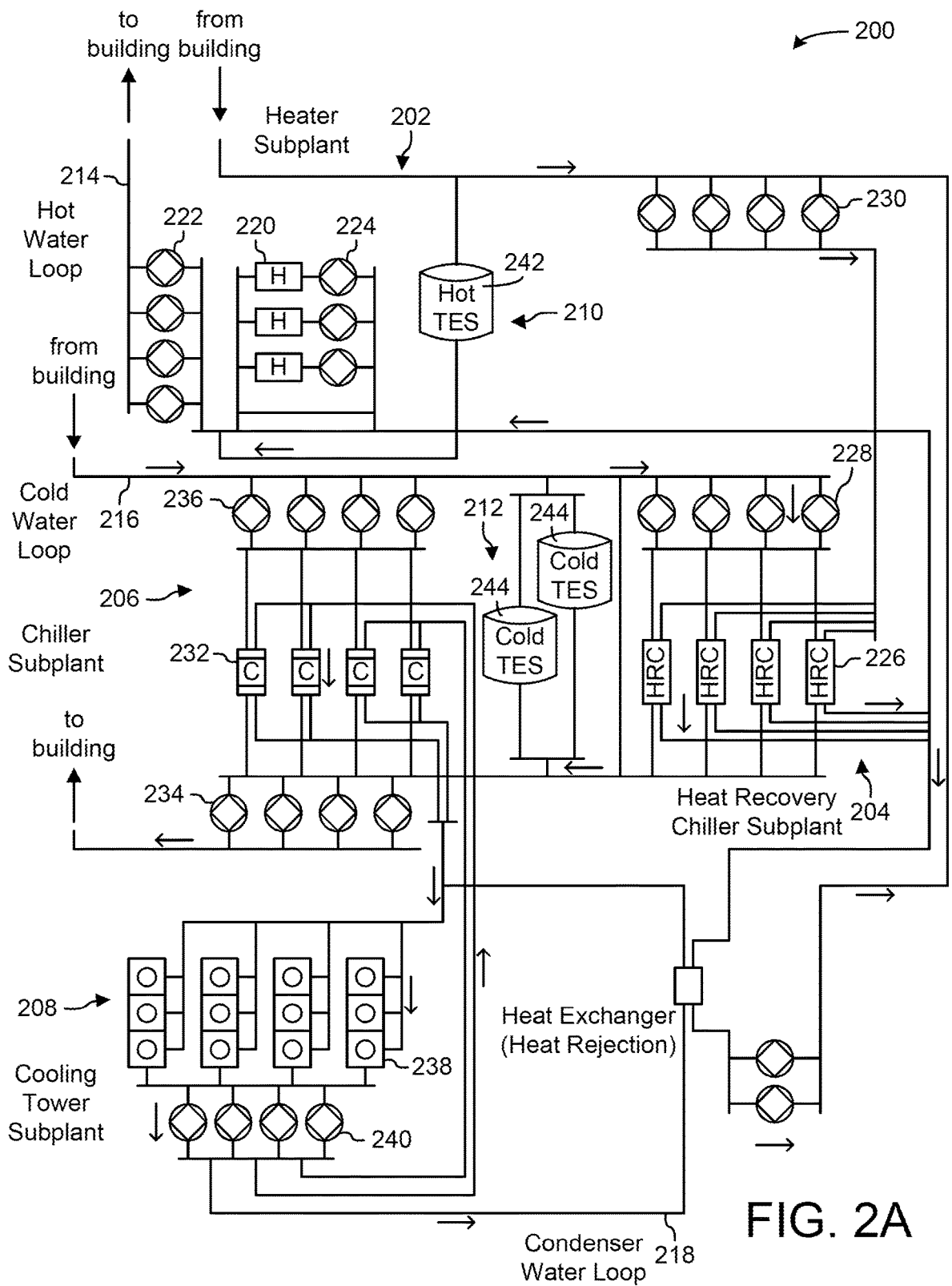
FIG. 2A is a schematic diagram of a waterside system which can be used to support the HVAC system of FIG. 1, according to some embodiments.

Referring now to FIG. 2A, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2A, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 (e.g., variable refrigerant flow (VRF) system 201, described below with reference to FIG. 2B) are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 2B:
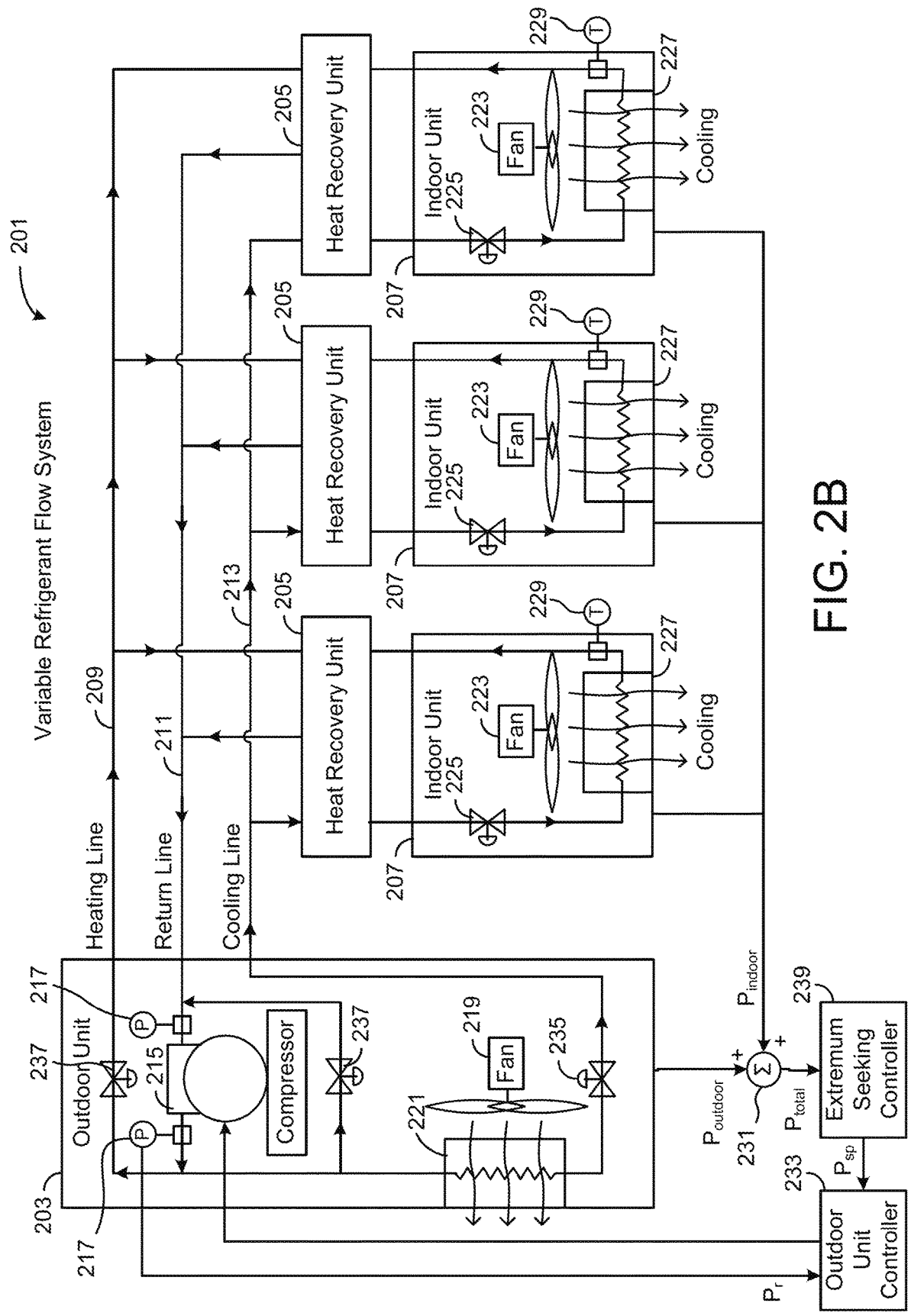
FIG. 2B is a block diagram of a variable refrigerant flow system which can be used to support the HVAC system of FIG. 1, according to some embodiments.

Referring now to FIG. 2B, a VRF system 201 is shown, according to some embodiments. VRF system 201 is shown to include an outdoor unit 203, several heat recovery units 205, and several indoor units 207. In some embodiments, outdoor unit 203 is located outside a building (e.g., on a rooftop) whereas indoor units 207 are distributed throughout the building (e.g., in various rooms or zones of the building). In some embodiments, VRF system 201 includes several heat recovery units 205. Heat recovery units 205 can control the flow of a refrigerant between outdoor unit 203 and indoor units 207 (e.g., by opening or closing valves) and can minimize the heating or cooling load to be served by outdoor unit 203.

Outdoor unit 203 is shown to include a compressor 215 and a heat exchanger 221. Compressor 215 circulates a refrigerant between heat exchanger 221 and indoor units 207. Heat exchanger 221 can function as a condenser (allowing the refrigerant to reject heat to the outside air) when VRF system 201 operates in a cooling mode or as an evaporator (allowing the refrigerant to absorb heat from the outside air) when VRF system 201 operates in a heating mode. A fan 219 provides airflow through heat exchanger 221. The speed of fan 219 can be adjusted to modulate the rate of heat transfer into or out of the refrigerant in heat exchanger 221.

Each indoor unit 207 is shown to include a heat exchanger 227 and an expansion valve 225. Each of heat exchangers 227 can function as a condenser (allowing the refrigerant to reject heat to the air within the room or zone) when the indoor unit 207 operates in a heating mode or as an evaporator (allowing the refrigerant to absorb heat from the air within the room or zone) when the indoor unit 207 operates in a cooling mode. Fans 223 provide airflow through heat exchangers 227. The speeds of fans 223 can be adjusted to modulate the rate of heat transfer into or out of the refrigerant in heat exchangers 227. Temperature sensors 229 can be used to measure the temperature of the refrigerant within indoor units 207.

In FIG. 2B, indoor units 207 are shown operating in the cooling mode. In the cooling mode, the refrigerant is provided to indoor units 207 via cooling line 213. The refrigerant is expanded by expansion valves 225 to a cold, low pressure state and flows through heat exchangers 227 (functioning as evaporators) to absorb heat from the room or zone within the building. The heated refrigerant then flows back to outdoor unit 203 via return line 211 and is compressed by compressor 215 to a hot, high pressure state. The compressed refrigerant flows through heat exchanger 221 (functioning as a condenser) and rejects heat to the outside air. The cooled refrigerant can then be provided back to indoor units 207 via cooling line 213. In the cooling mode, flow control valves 237 can be closed and expansion valve 235 can be completely open.

In the heating mode, the refrigerant is provided to indoor units 207 in a hot state via heating line 209. The hot refrigerant flows through heat exchangers 227 (functioning as condensers) and rejects heat to the air within the room or zone of the building. The refrigerant then flows back to outdoor unit via cooling line 213 (opposite the flow direction shown in FIG. 2B). The refrigerant can be expanded by expansion valve 235 to a colder, lower pressure state. The expanded refrigerant flows through heat exchanger 221 (functioning as an evaporator) and absorbs heat from the outside air. The heated refrigerant can be compressed by compressor 215 and provided back to indoor units 207 via heating line 209 in a hot, compressed state. In the heating mode, flow control valves 237 can be completely open to allow the refrigerant from compressor 215 to flow into heating line 209.

Outdoor unit controller 233 can operate outdoor unit 203 to achieve the pressure setpoint $P_{sp}$ provided by extremum-seeking controller 239. Operating outdoor unit 203 can include adjusting the speed of compressor 215 and/or the speed of fan 219. For example, outdoor unit controller 233 can increase the speed of compressor 215 to increase compressor discharge pressure or decrease the compressor suction pressure. Outdoor unit controller 233 can increase the speed of fan 219 to increase the heat transfer within heat exchanger 221 or decrease the speed of fan 219 to decrease the heat transfer within heat exchanger 221.

Figure 3:
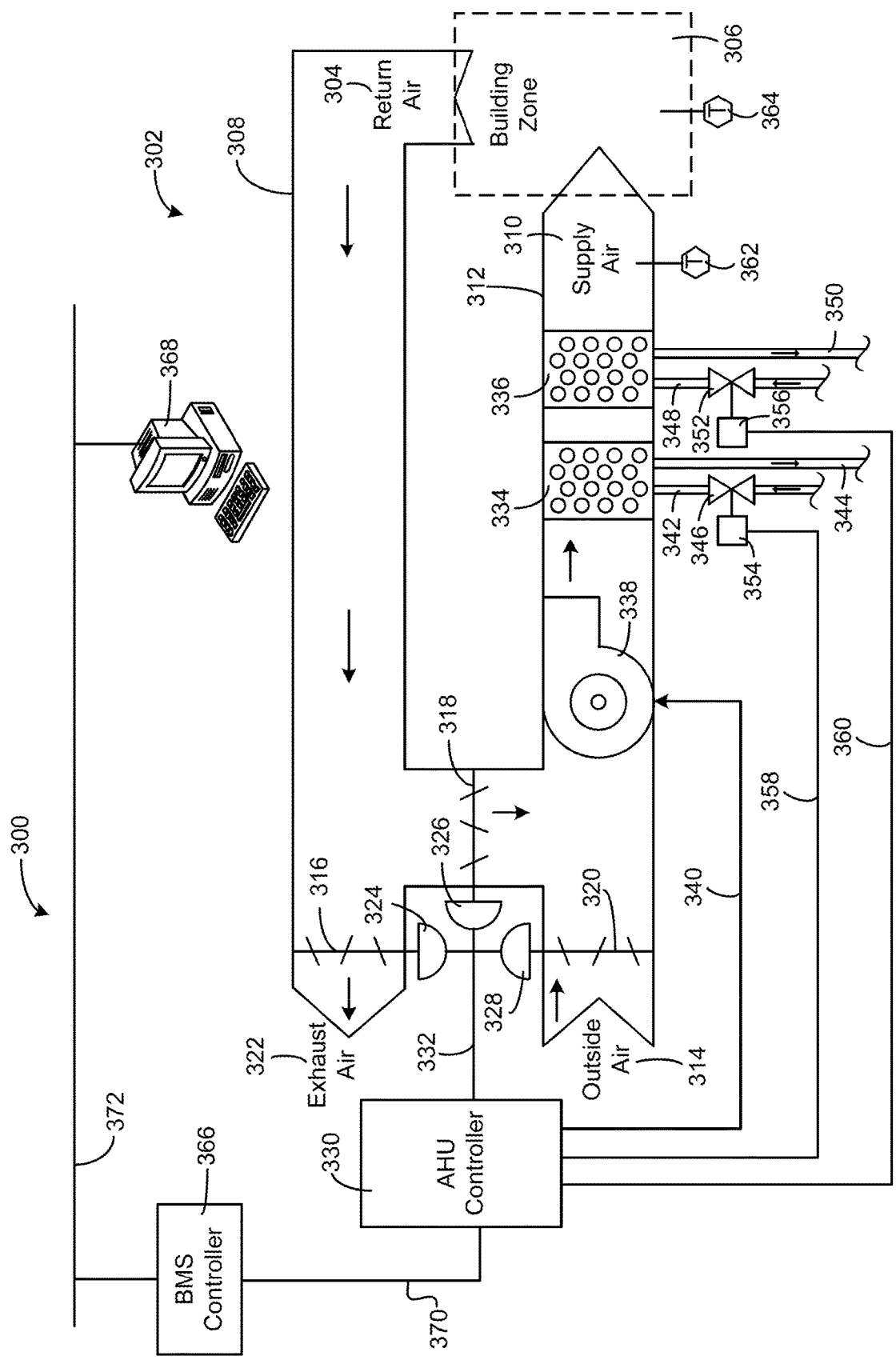
FIG. 3 is a block diagram of an airside system which can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100

(e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
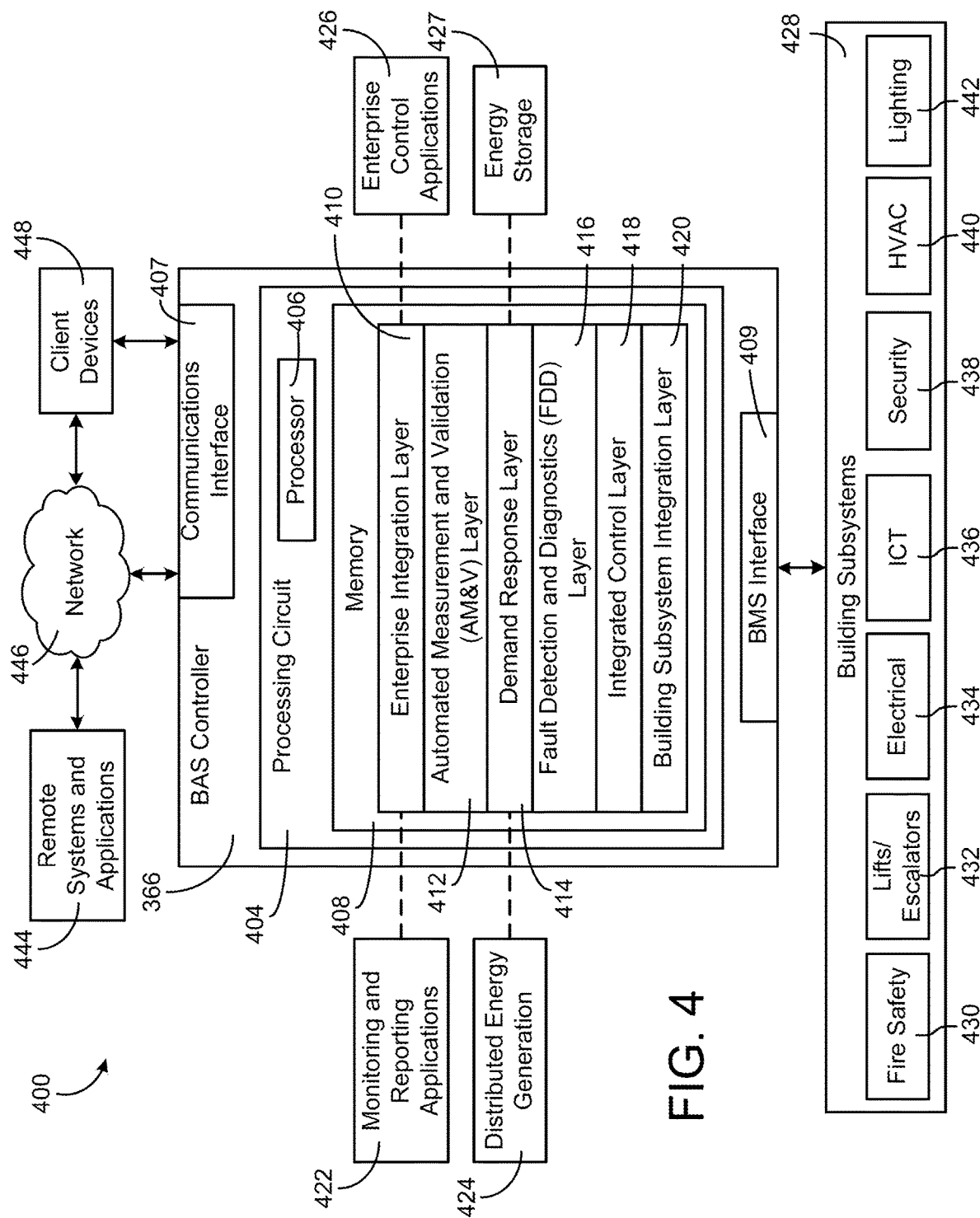
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems

428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC System With Free Cooling

Figure 5:
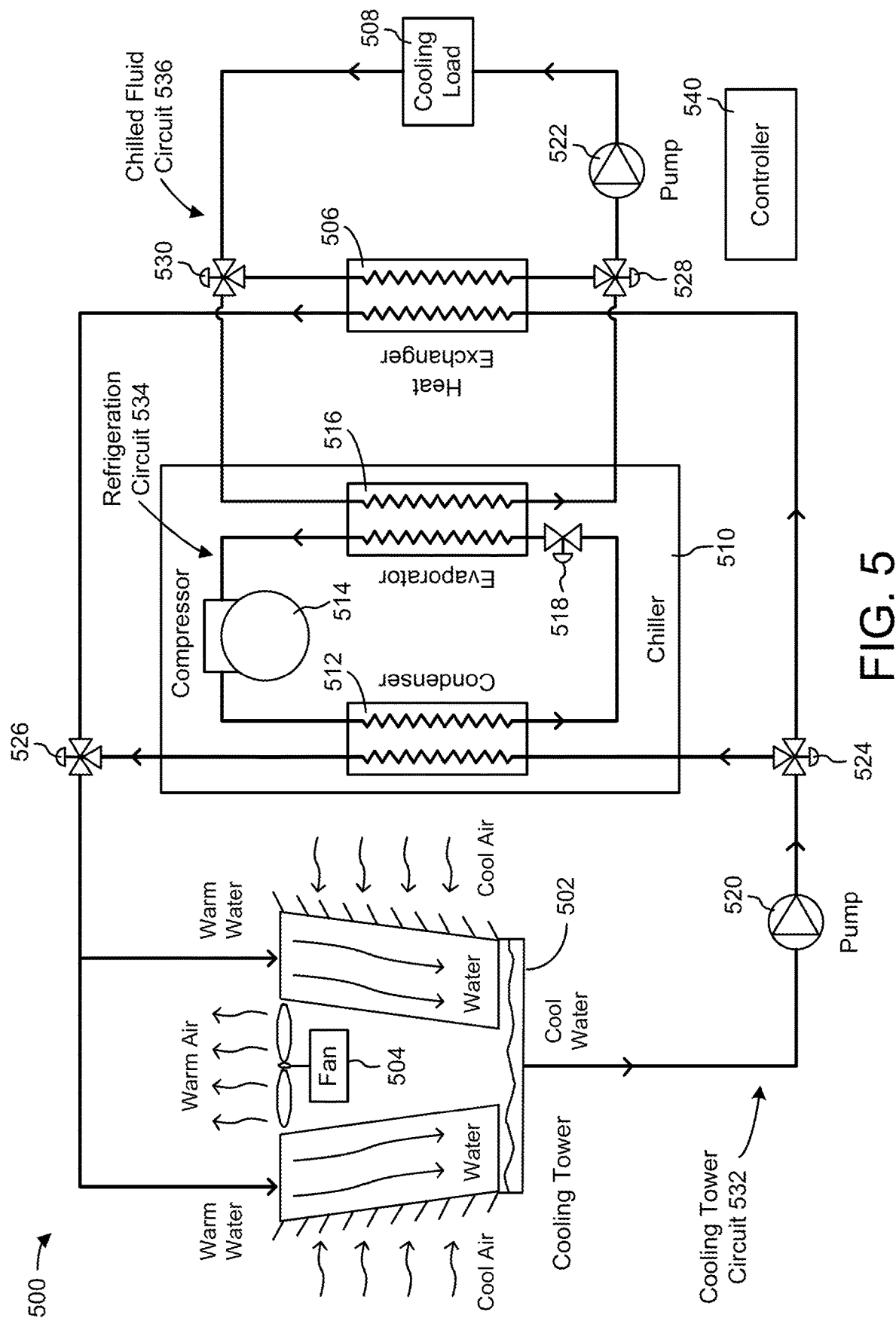
FIG. 5 is a block diagram of an HVAC system configured to operate in a mechanical cooling state and a free cooling state, according to some embodiments.

Referring now to FIG. 5, a block diagram of a HVAC system 500 with free cooling is shown, according to an exemplary embodiment. HVAC system 500 is configured to provide cooling to a cooling load 508. Cooling load 508 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 522 circulates a chilled fluid to cooling load 508 via a chilled fluid circuit 536. The chilled fluid can absorb heat from cooling load 508, thereby providing cooling to cooling load 508 and warming the chilled fluid.

HVAC system 500 is shown to include a cooling tower 502, a heat exchanger 506, and a chiller 510. HVAC system 500 can operate in both a mechanical cooling state (shown in FIG. 6) and a free cooling state (shown in FIG. 7). HVAC system 500 can transition between the mechanical cooling state and free cooling state to provide economically optimal cooling for cooling load 508. In the mechanical cooling state, the chilled fluid exiting cooling load 508 is directed to an evaporator 516 of chiller 510. Chiller 510 operates to provide mechanical cooling (e.g., vapor compression cooling) for the chilled fluid in evaporator 516 by transferring heat from the chilled fluid to a refrigerant which circulates through evaporator 516 via a refrigeration circuit 534. In the free cooling state, the chilled fluid exiting cooling load 608 is directed to a heat exchanger 506. Heat exchanger 506 is configured to transfer heat from the chilled fluid to water (or any other coolant) which circulates through heat exchanger 506 via a cooling tower circuit 532.

Cooling tower 502 can be configured to cool the water in cooling tower circuit 532 by transferring heat from the water to outside air. In some embodiments, a pump 520 circulates water through cooling tower 502 via cooling tower circuit 532. Cooling tower 502 may include a fan 504 which causes cool air to flow through cooling tower 502. Cooling tower 502 places the cool air in a heat exchange relationship with the warmer water, thereby transferring heat from warmer water to the cooler air. In the mechanical cooling state, cooling tower 502 can provide cooling for a condenser 512 of chiller 510. Condenser 512 can transfer heat from the refrigerant in refrigeration circuit 534 to the water in cooling tower circuit 532. In the free cooling state, cooling tower 502 can provide cooling for heat exchanger 506. Heat exchanger 506 can transfer heat from the chilled fluid in chilled fluid circuit 536 to the water in cooling tower circuit 532. Although cooling tower circuit 532 is shown and described as circulating water, it should be understood that any type of coolant or working fluid (e.g., water, glycol, $CO_2$, etc.) can be used in cooling tower circuit 532.

Chiller 510 is shown to include a condenser 512, a compressor 514, an evaporator 516, and an expansion device 518. Compressor 514 can be configured to circulate a refrigerant between condenser 512 and evaporator 516 via refrigeration circuit 534. Compressor 514 operates to compress the refrigerant to a high pressure, high temperature state. The compressed refrigerant flows through condenser 512, which transfers heat from the refrigerant in refrigeration circuit 534 to the water in cooling tower circuit 532. The cooled refrigerant then flows through expansion device 518, which expands the refrigerant to a low temperature, low pressure state. The expanded refrigerant flows through evaporator 516, which transfers heat from the chilled fluid in chilled fluid circuit 536 to the refrigerant in refrigeration circuit 534.

In some embodiments, chiller 510 is active only when HVAC system operates in the mechanical cooling state. In the free cooling state, chiller 510 can be deactivated to reduce energy consumption. In some embodiments, HVAC system 500 includes multiple chillers 510. Each of chillers 510 can be arranged in parallel and configured to provide cooling for the fluid in chilled fluid circuit 536. Similarly, HVAC system 500 can include multiple cooling towers 502. Each of the cooling towers 502 can be arranged in parallel and configured to provide cooling for the water in cooling tower circuit 532.

Still referring to FIG. 5, HVAC system 500 is shown to include several valves 524, 526, 528, and 530. Valves 524-530 may be three-way valves which can be operated by a controller 540 to control the flow of the chilled fluid in chilled fluid circuit 536 and the water in cooling tower circuit 532. For example, when HVAC system 500 transitions into the mechanical cooling state, controller 540 can operate valves 528 and 530 to direct the chilled fluid exiting cooling load 508 through evaporator 516 and prevent the chilled fluid from flowing through heat exchanger 506. In the mechanical cooling state, controller 540 can operate valves 524 and 526 to direct the water exiting cooling tower 502 through condenser 512 and prevent the water from flowing through heat exchanger 506. Conversely, when HVAC system 500 transitions into the free cooling state, controller 540 can operate valves 528 and 530 to direct the chilled fluid exiting cooling load 508 through heat exchanger 506 and prevent the chilled fluid from flowing through evaporator 516. In the free cooling state, controller 540 can operate valves 524 and 526 to direct the water exiting cooling tower 502 through heat exchanger 506 and prevent the water from flowing through condenser 512.

Figure 6:
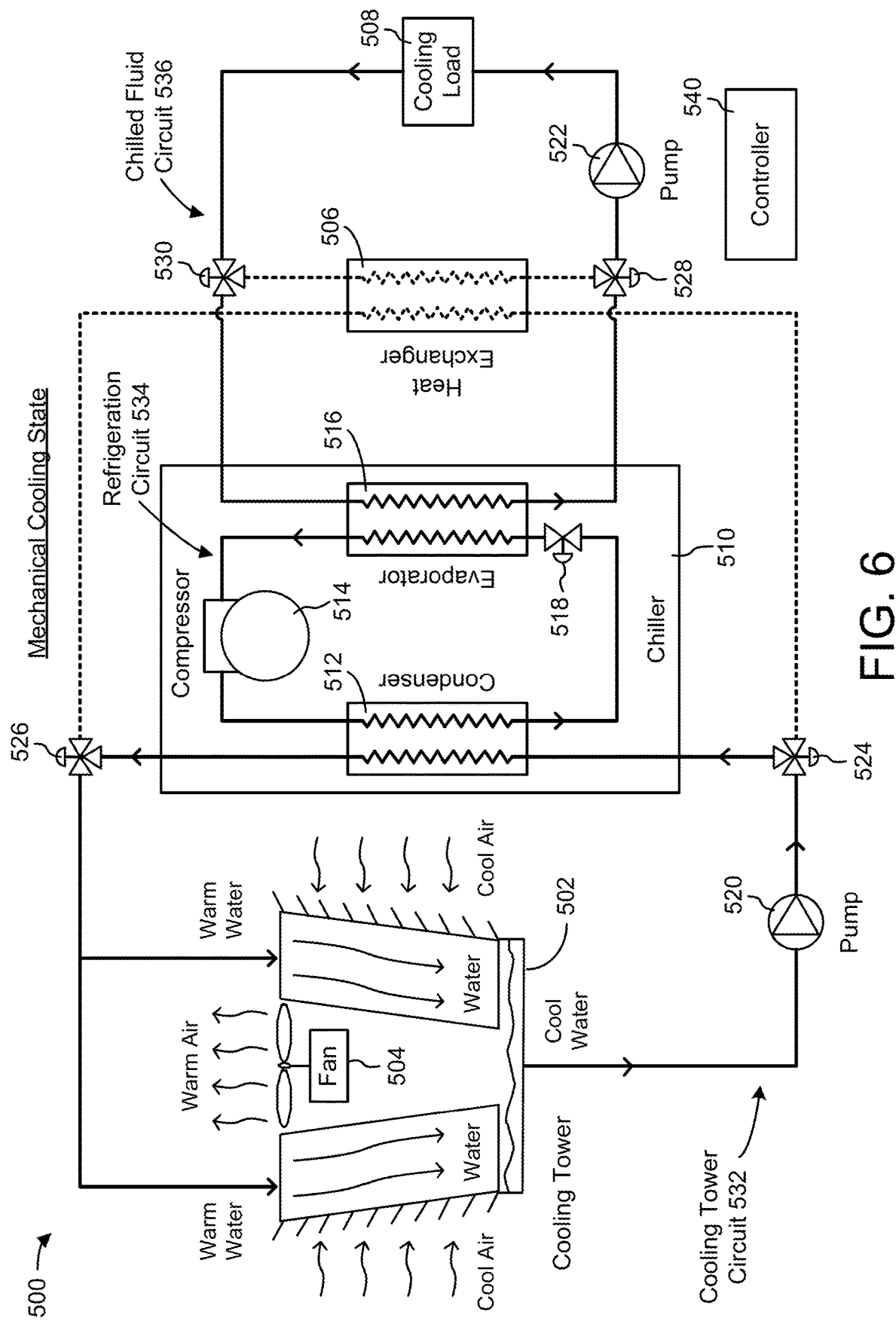
FIG. 6 is a block diagram illustrating operation of the HVAC system of FIG. 5 in the mechanical cooling state, according to some embodiments.

Referring now to FIG. 6, a block diagram illustrating the operation of HVAC system 500 in the mechanical cooling state is shown, according to an exemplary embodiment. In FIG. 6, the flow paths used in the mechanical cooling state are shown in solid lines, whereas the flow paths not used in the mechanical cooling state are shown in broken lines. In the mechanical cooling state, chiller 510 is used to provide cooling for the chilled fluid in chilled fluid circuit 536. Both chilled fluid circuit 536 and cooling tower circuit 532 are fluidly connected to chiller 510. Heat exchanger 506 is not used and the fluid conduits connecting to heat exchanger 506 are blocked.

In the mechanical cooling state, controller 540 operates valve 524 to direct the cool water from cooling tower 502 through condenser 512. Condenser 512 transfers heat from the refrigerant in refrigeration circuit 534 to the cool water in cooling tower circuit 532, thereby warming the water. The warm water then flows from condenser 512 to valve 526. Controller 540 operates valve 526 to direct the warm water to cooling tower 502. Cooling tower 502 transfers heat from the water to cooler air flowing through cooling tower 502. Controller 540 can operate fan 504 to modulate the airflow through cooling tower 502, which adjusts the rate of heat transfer in cooling tower 502. Controller 540 can also operate pump 520 to modulate the flowrate of the water through cooling tower circuit 532, which adjusts the rate of heat transfer in cooling tower 502 and/or condenser 512.

In the mechanical cooling state, controller 540 operates valve 530 to direct the fluid exiting cooling load 508 through evaporator 516. Evaporator 516 transfers heat from the fluid in chilled fluid circuit 536 to the refrigerant in refrigeration circuit 534, thereby chilling the fluid in chilled fluid circuit 536. The chilled fluid then flows from evaporator 516 to valve 528. Controller 540 operates valve 528 to direct the chilled fluid to cooling load 508. Cooling load 508 rejects heat to the chilled fluid, thereby providing cooling for cooling load 508 and warming the chilled fluid. Controller 540 can operate pump 522 to modulate the flowrate of the chilled fluid through chilled fluid circuit 536, which adjusts the rate of heat transfer in evaporator 516 and/or at cooling load 508.

Figure 7:
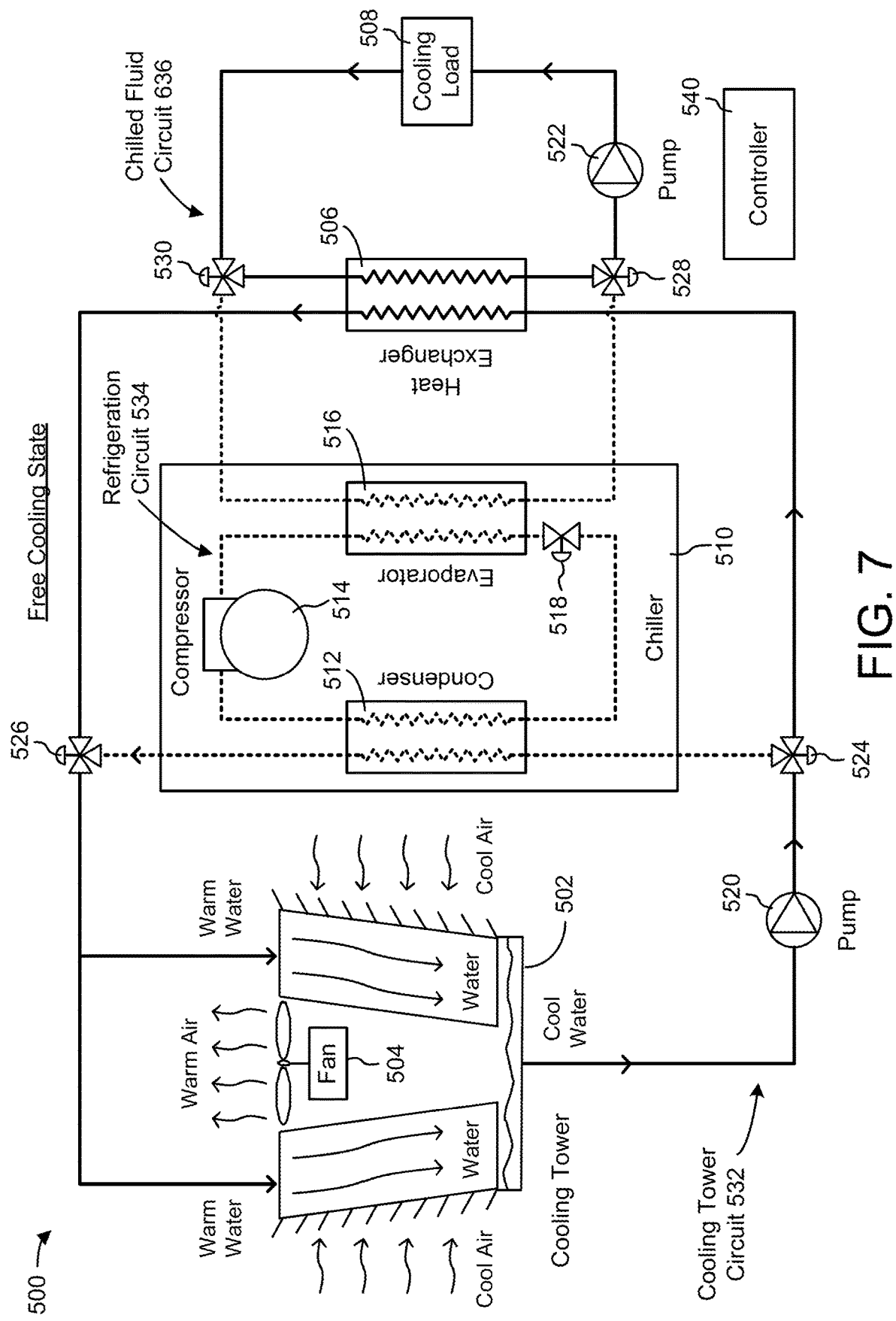
FIG. 7 is a block diagram illustrating operation of the HVAC system of FIG. 5 in the free cooling state, according to some embodiments.

Referring now to FIG. 7, a block diagram illustrating the operation of HVAC system 500 in the free cooling state is shown, according to an exemplary embodiment. In FIG. 7, the flow paths used in the free cooling state are shown in solid lines, whereas the flow paths not used in the free cooling state are shown in broken lines. In the free cooling state, heat exchanger 506 is used to provide cooling for the chilled fluid in chilled fluid circuit 536. Both chilled fluid circuit 536 and cooling tower circuit 532 are fluidly connected to heat exchanger 506. Chiller 510 is not used and the fluid conduits connecting to chiller 510 are blocked.

In the free cooling state, controller 540 operates valve 524 to direct the cool water from cooling tower 502 through heat exchanger 506. Heat exchanger 506 transfers heat from the fluid in chilled fluid circuit to the cool water in cooling tower circuit 532, thereby warming the water. The warm water then flows from heat exchanger 506 to valve 526. Controller 540 operates valve 526 to direct the warm water to cooling tower 502. Cooling tower 502 transfers heat from the water to cooler air flowing through cooling tower 502. Controller 540 can operate fan 504 to increase or decrease the airflow through cooling tower 502, which increases or decreases the rate of heat transfer in cooling tower 502. Controller 540 can also operate pump 520 to modulate the flowrate of the water through cooling tower circuit 532, which adjusts the rate of heat transfer in cooling tower 502 and/or heat exchanger 506.

In the free cooling state, controller 540 operates valve 530 to direct the fluid exiting cooling load 508 through heat exchanger 506. Heat exchanger 506 transfers heat from the fluid in chilled fluid circuit 536 to the water in cooling tower circuit 532, thereby chilling the fluid in chilled fluid circuit 536. The chilled fluid then flows from heat exchanger 506 to valve 528. Controller 540 operates valve 528 to direct the chilled fluid to cooling load 508. Cooling load 508 rejects heat to the chilled fluid, thereby providing cooling for cooling load 508 and warming the chilled fluid. Controller 540 can operate pump 522 to modulate the flowrate of the chilled fluid through chilled fluid circuit 536, which adjusts the rate of heat transfer in heat exchanger 506 and/or at cooling load 508.

Central Plant Optimization System

Figure 8:
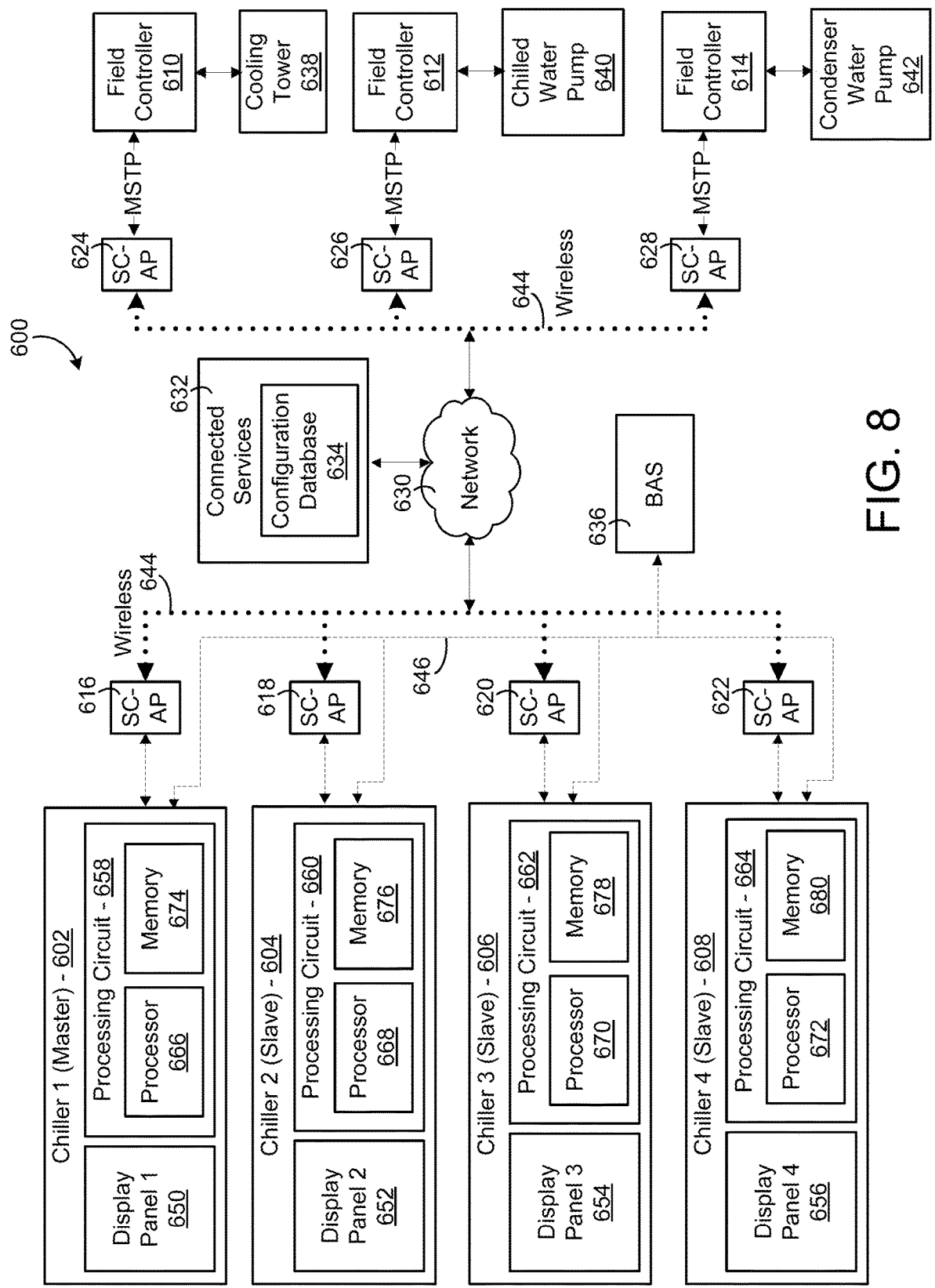
FIG. 8 is a block diagram of a central plant optimization system that can be implemented in the HVAC system of FIG. 1, according to some embodiments.

Turning now to FIG. 8, a central plant optimization system (CPOS) 600 is depicted. In various embodiments, system 600 may comprise a subsystem or component of HVAC system 100. CPOS 600 is shown to include multiple chillers (e.g., chiller 602, chiller 604, chiller 606, and chiller 608). In some embodiments, chillers 602-608 are identical or substantially similar to chiller 510, described above with reference to FIGS. Chillers 602-608 are shown to be communicably coupled to BAS 636 via network 646. In some embodiments, BAS 636 is identical or substantially similar to BAS controller 366 described above with reference to FIG. 4. For example, according to an exemplary embodiment, BAS 636 is a METASYS® brand building automation system, as sold by Johnson Controls, Inc. In some embodiments, chillers 602-608 may communicate with BAS 626 via a BACnet communications protocol.

CPOS 600 is further shown to include one or more cooling towers (e.g., cooling tower 638), one or more chilled water pumps (e.g., chilled water pump 640), and one or more condenser water pumps (e.g., condenser water pump 642). In some embodiments, these devices may be identical or substantially similar to devices described above with reference to FIGS. 2 and 5-7. For example, cooling tower 638 may be identical or substantially similar to cooling tower subplant 208, chilled water pump 640 may be identical or substantially similar to chilled water pumps 234-236, and condenser water pump 642 may be identical or substantially similar to condenser water pumps 240. In various embodiments, any or all of cooling tower 638, chilled water pump 640, and condenser water pump 642 may be controlled by one or more field controllers (e.g., field controllers 610-614). For example, field controllers 610-614 may be configured to receive control signals from a master controller and transmit control signals to connected devices (e.g., cooling tower 638, chilled water pump 640, and condenser water pump 642). In some embodiments, the connected devices also include isolation valves.

In various embodiments, chillers 602-608, cooling tower 638, chilled water pump 640, and condenser water pump 642 may be connected to wireless network 644 via a wired connection to a smart communicating access point (SC-AP) (e.g., SC-AP 616-628). In some embodiments, field controllers 610-614 may communicate with SC-APs 624-628 via a master-slave token passing (MSTP) protocol. In some embodiments, the SC-AP is a Mobile Access Portal (MAP) device manufactured by Johnson Controls, Inc. Further details of the MAP device may be found in U.S. patent application Ser. No. 15/261,843 filed Sep. 9, 2016. The entire disclosure of U.S. patent application Ser. No. 15/261,843 is incorporated by reference herein.

Wireless network 644 may enable devices (e.g., chillers 602-608, cooling tower 638, chilled water pump 640, and condenser water pump 642) to communicate with each on a communications bus using any suitable communications protocol (e.g., Wi-Fi, Bluetooth, ZigBee, etc.). SC-AP 616-628 may also enable devices to communicate wirelessly via network 630 with connected services 632. In various embodiments, connected services 632 may include a variety of cloud services, remote databases, and remote devices used to configure, control, and view various aspects of CPOS 600. For example, connected services 632 may include a mobile device or a laptop configured to display configuration parameters of CPOS 600 and receive user input regarding the configuration parameters.

In some embodiments, connected services 632 includes configuration database 634. In various embodiments, configuration database 634 may be hosted in a secure web server that permits secure remote access through an internet connection. Configuration database 634 may be configured to store various HVAC device operating parameters that correspond to device identification codes. In some embodiments, configuration database 634 may be queried by a controller via a message containing device identification codes. In response, configuration database 634 may retrieve and transmit device operating parameters to the controller.

Still referring to FIG. 8, each of the chillers 602-608 is shown to include a display panel 650-656 and a processing circuit 658-664. The display panels 650-656 may be configured to display information to a user regarding the current status of CPOS 600. In some embodiments, display panels 650-656 are also configured to receive user input (e.g., via an attached keypad, touchscreen, etc.). In some embodiments, the presence of display panels 650-656 and processing circuits 658-664 serve to designate chillers 602-608 as "smart" chillers. Each chiller processing circuit 658-664 may contain a processor 666-672 and memory 674-680. Processors 666-672 can be implemented as general purpose processors, application specific integrated circuits (ASICs), one or more field programmable gate arrays (FPGAs), a group of processing components, or other suitable electronic processing components. Memory 674-680 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 674-680 can be or include volatile memory or non-volatile memory. Memory 674-680 may include object code components, script components, or any other type of information structure for supporting the various activities and information structures described in the present application. According to some embodiments, memory 674-680 is communicably connected to processors 666-672 via processing circuit 658-664 and includes computer code for executing (e.g., by processing circuits 658-664 and/or processors 666-672) one or more processes described herein.

Figure 9:
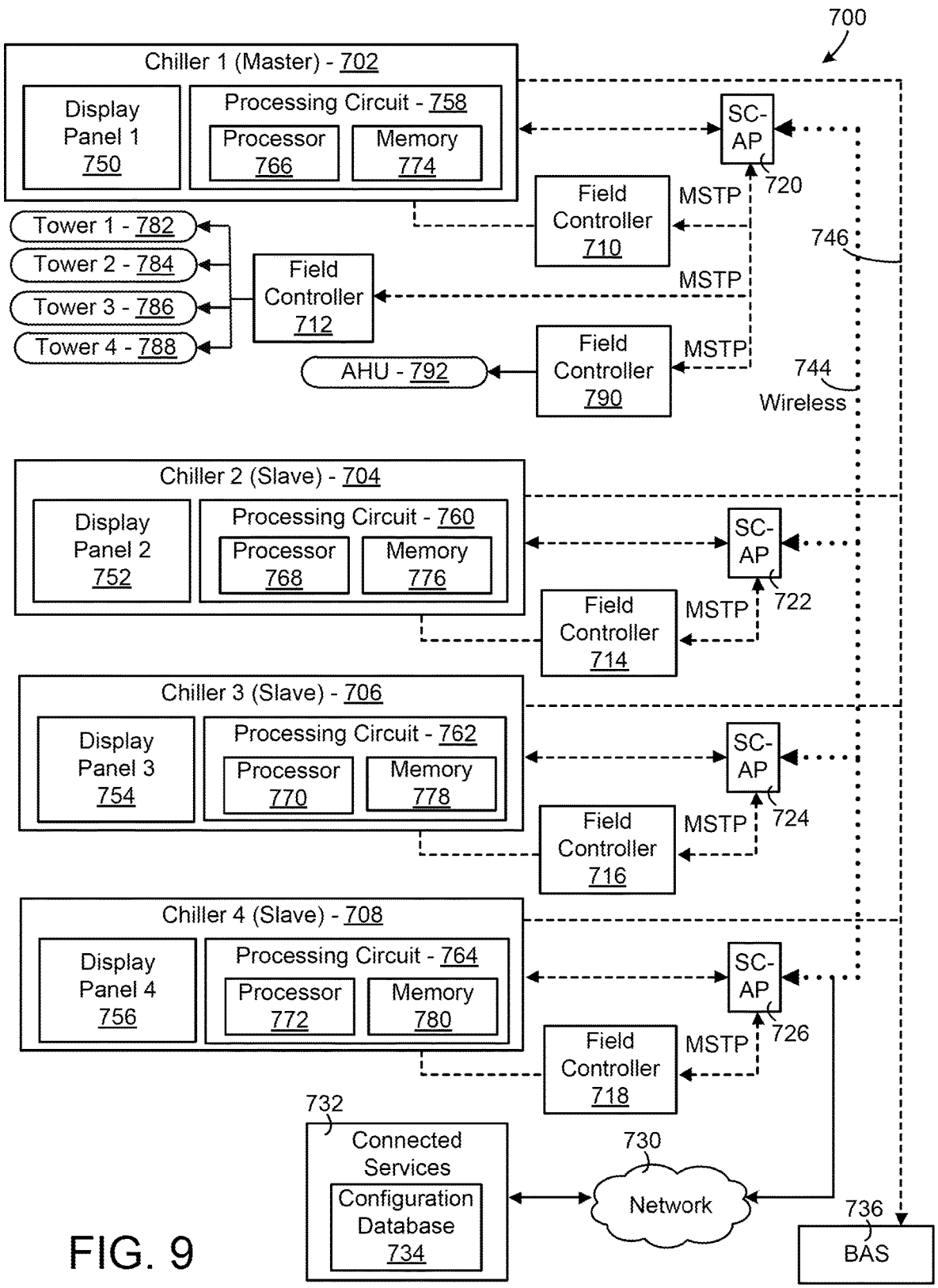
FIG. 9 is another block diagram of a central plant optimization system that can be implemented in the HVAC system of FIG. 1, according to some embodiments.

Referring now to FIG. 9, an alternative configuration central plant optimization system (CPOS) 700 is depicted, according to some embodiments. As shown, CPOS 700 includes multiple chillers 702-708. Each of the chillers is shown to include a display panel 750-756 and a processing circuit 758-764 with processors 766-772 and memory 774-780. In some embodiments, chillers 702-708 are identical or substantially similar to chillers 602-608 described above with reference to FIG. 8. Chillers 702-708 may communicate with BAS 736 via network 746. In some embodiments, BAS 736 is identical or substantially similar to BAS controller 366 described above with reference to FIG. 4.

Each of the chillers 702-708 is shown to communicate wirelessly (e.g., with each other, or with connected services 732 via network 730) via connections to access points 720-726. In contrast to FIG. 8, each of the chiller devices 702-708 may be connected to an additional field controller 710-718. In some embodiments, field controllers 710-718 may be configured to provide additional control functionality to chiller devices 702-708. In other embodiments, field controllers 710-718 may control other HVAC devices. For example, field controller 712 is shown to be communicably coupled to cooling tower devices 782-788, and field controller 790 is shown to be communicably coupled to air handling unit (AHU) 792. In various embodiments, field controllers 710-718 may be communicably coupled to SC-APs 720-726, and may be configured to transmit and receive messages via MSTP protocols.

Building Management System With Data Driven User Interfaces

Figure 10:
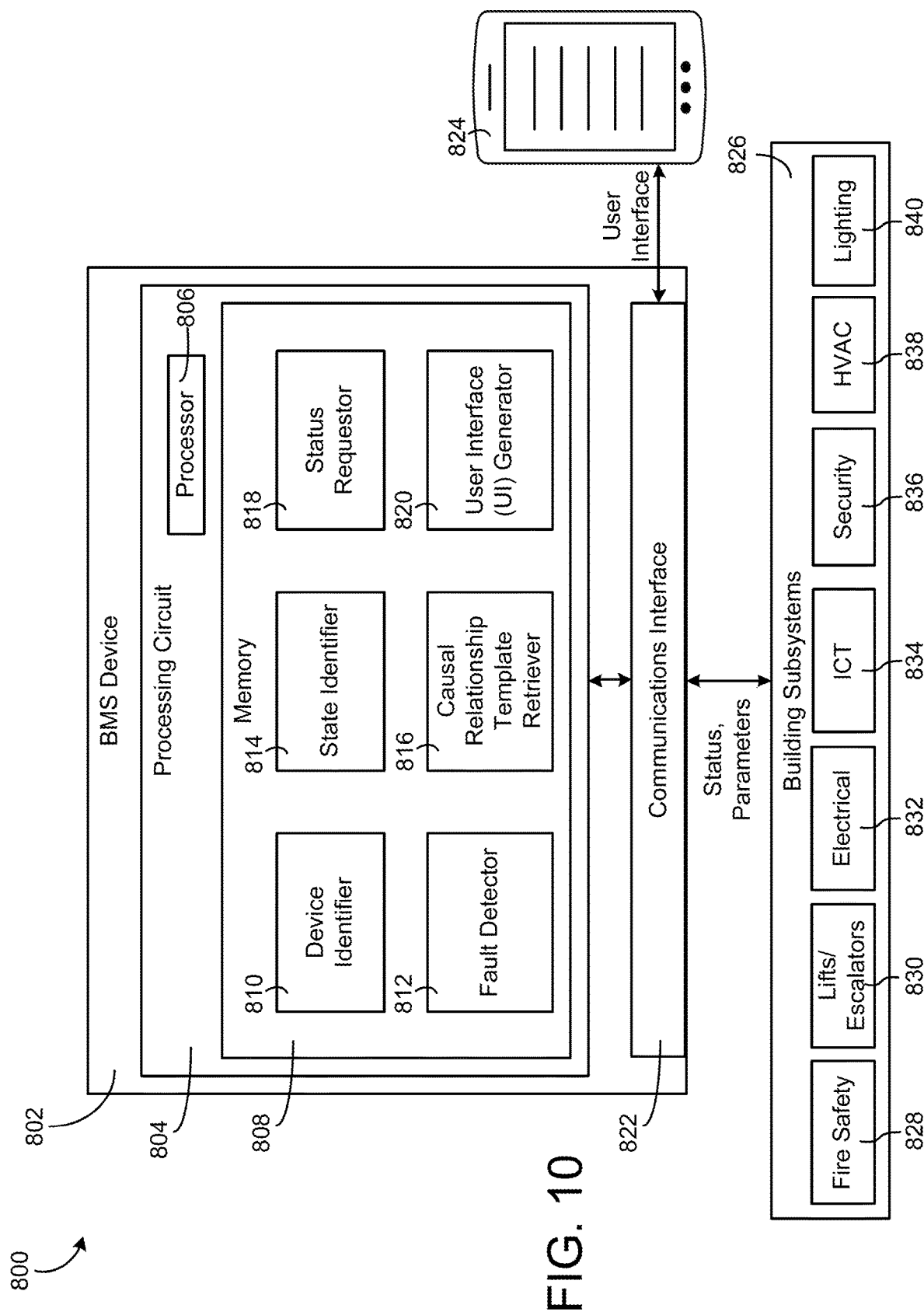
FIG. 10 is a block diagram of a BMS that may create and display data-driven user interfaces, according to some embodiments.

Referring now to FIG. 10, a block diagram of a building management system (BMS) 800 is shown, according to some embodiments. BMS 800 can be implemented in building 10 to automatically monitor and control various building functions. BMS 800 can also be implemented in building 10 to generate data driven user interfaces. BMS 800 is shown to include BMS device 802, a user computing device 824, a plurality of building subsystems 826. User computing device 824 a desktop computer, a computer server with a user interface, a laptop computer, a tablet, a smartphone, a PDA, or any other type of mobile or non-mobile device. Building subsystems 826 are shown to include a fire safety subsystem 828, a lift/escalators subsystem 830, a building electrical subsystem 832, an information communication technology (ICT) subsystem 834, a security subsystem 836, an HVAC subsystem 838, and a lighting subsystem 840. In some embodiments, building subsystem 826 is identical or substantially similar to building subsystem 428, described above with reference to FIG. 4.

Each of the building subsystems 826 may include any number of devices, controllers, and connections for completing its individual functions and control activities. HVAC subsystem 838 may include many of the same components of HVAC system 100 (as described in FIGS. 1-3), HVAC system 500 (as described in FIGS. 5-7), CPOS 600 (as described in FIG. 8) and CPOS 700 (as described in FIG. 9). For example, HVAC subsystem may include any number of chillers, heaters, handling units, economizers, field controllers, supervisory controllers, actuators, temperature sensors, and/or other devices for controlling the temperature, humidity, airflow, or other variable conditions within building 10.

Still referring to FIG. 10, BMS device 802 is shown to include a processing circuit 804 and a communications interface 822. In various embodiments, BMS device 802 may be a master controller for a central plant optimization system. For example, BMS device 802 may be chiller device 602 of CPOS 600, or chiller device 702 of CPOS 700. Communications interface 822 may facilitate communications between BMS device 802 and user device 824 and/or building subsystems 826. Interface 822 can be or include wired or wireless communications interfaces (e.g., jacks, antennas, transmitters, receivers, transceivers, wire terminals, etc.) for conducting data communications with user device 824 and/or building subsystems 826. In various embodiments, communications via interface 822 can be direct (e.g., local wired or wireless communications) or via a communications network (e.g., a WAN, the Internet, a cellular network, etc.).

Processing circuit 804 is shown to include a processor 806 and memory 808. Processing circuit 804 can be communicably connected to communications interface 822 such that the processing circuit 804 and the various components thereof can send and receive data via interface 822. Processor 806 can be implemented as a general purpose processor, an application specific integrated circuit (ASIC), one or more field programmable gate arrays (FPGAs), a group of processing components, or other suitable electronic processing components.

Memory 808 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 808 can be or include volatile memory or non-volatile memory. Memory 808 can include database components, object code components, script components, or any other type of information structure for supporting the various activities and information structures described in the present application.

Memory 808 is shown to include a plurality of modules, including a device identifier module 810, a fault detector module 812, a state identifier module 814, a causal relationship template retriever module 816, a status requestor module 818, and a user interface (UI) generator module 820. Device identifier module 810 may be configured to identify all devices communicating with BMS device 802 via communications interface 822. In various embodiments, devices communicating with BMS device 802 include all components of building subsystems 826. In some embodiments, further details of an equipment discovery and commissioning process that may be utilized with CPOS 600 and CPOS 700 may be found in U.S. patent application Ser. No. 15/591,952 filed May 10, 2017. The entire disclosure of U.S. patent application Ser. No. 15/591,952 is incorporated by reference herein.

Fault detector module 812 may be configured to identify fault conditions within the devices identified by the device identifier module 810. For example, fault conditions may include a low condenser water condition in a chiller device (e.g., condenser 512 of HVAC system 500), or a low air flow condition in a rooftop unit (e.g., AHU 302 of airside system 300). Further examples of fault conditions may include, but are not limited to, a temperature or flow sensor failure, a valve failure, an actuator failure, a pump failure, and a fan failure. Fault conditions may arise due to electrical and/or mechanical issues. For example, a fault condition may be detected in a valve due to a buildup of debris that blocks the valve from travel between its open and closed positions. However, a fault condition may also be detected in a valve if an electrical connection to the valve is damaged and the valve fails to respond to commands originating from a controller.

State identifier module 814 may be configured to identify an operating state for the devices identified by device identifier module 810. For example, the identified devices may be operating in an alarm state due to the existence of a fault condition identified by fault detector module 812. In other embodiments, the identified devices are operating in a normal state. Examples of normal states may include a cooling state, a heating state, a commissioning state, and a standby state.

Causal relationship template retriever module 816 may be configured to store and retrieve relationship templates. Relationship templates may include system parameters related to an operational state of the system. For example, in some embodiments, the system is operating in an alarm state and the relationship template is a fault causation template. The fault causation template may be specific to a fault condition. In other words, the fault causation template may include all system parameters that are potentially relevant to the cause of a particular fault condition. For example, if a low water fault is detected in a condenser (e.g., condenser 512), the fault causation template may include parameters of components within the same refrigeration circuit as the condenser (e.g., cooling tower circuit 532, refrigeration circuit 534). As another example, if a sensor (e.g., temperature sensor 362) detects an abnormally high air temperature in an airside system (e.g., airside system 300), the fault causation template may include parameters of components upstream of the sensor (e.g., mixing damper 318, outdoor air damper 320, fan 338, cooling coil 334, heating coil 336).

In other embodiments, the relationship template stored in the causal relationship template retriever module 816 is a state template. The state template may be specific to a state (e.g., a heating state, a cooling state) as identified by state identifier module 814. For example, if the state identifier module 814 identifies that a system (e.g., a variable air volume (VAV) unit) is operating in a cooling state, the state template may include system parameters such as a cold air supply temperature, an air flow rate, a damper position, and a damper effort. Conversely, if the system is operating in a heating state, the state template may include system parameters such as a hot water supply temperature, a hot water valve position, and a valve effort.

Status requestor module 818 may be configured to retrieve and store operating data from devices identified by device identifier module 810. In some embodiments, status requestor module 818 retrieves and stores device data according to the parameters of the relationship template retrieved by the causal relationship template retriever module 816. For example, if, as described above, the system is operating in a cooling state, the status requestor module 818 may query a temperature sensor device to retrieve data for the cold air supply temperature parameter, a flow sensor device to retrieve data for the air flow rate parameter, and a damper device to retrieve data for the damper position and damper effort parameters.

UI generator module 820 may be configured to populate the system parameters of the relationship template with data retrieved by the status requestor module 818 and subsequently display the populated template. Further details of the user interfaces generated by UI generator module 820 are included below in FIGS. 11A-12C. In some embodiments, the UI generator module 820 transmits a signal via communications interface 822 to display the populated template user interface on user computing device 824. In other embodiments, the populated template user interfaces created by UI generator module 820 are transmitted to and displayed on the display screen of a smart chiller device (e.g., display panels 650-656, display panels 750-756). By displaying only the values of parameters relevant to the system operating state, the user interfaces negate the need for an operator to scroll through multiple pages of irrelevant data in order to obtain necessary information or resolve an alarm state.

Figure 11A:
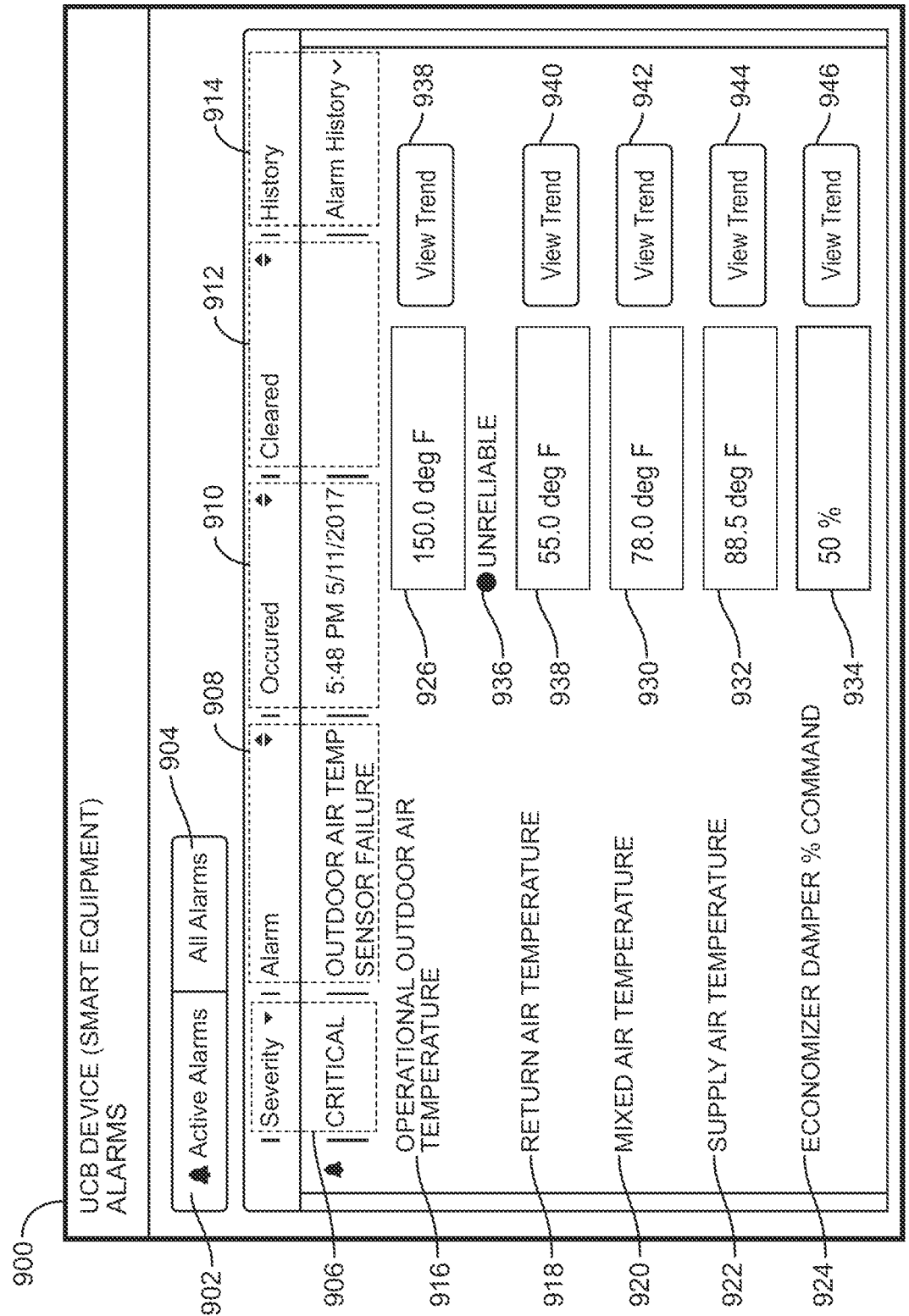
FIG. 11A is a diagram illustrating an alarm dashboard user interface for a unit control board that may be implemented in the BMS of FIG. 10, according to some embodiments.

Referring now to FIG. 11A, an alarm dashboard user interface 900 for a unit control board is depicted. In some embodiments, the unit control board is a component of BAS controller 366, utilized in BMS 400 and described above with reference to FIGS. 3-4. In other embodiments, the unit control board is a component of BMS device 802, utilized in BMS 800 and described above with reference to FIG. 10. Alarm dashboard user interface 900 is shown to include an "Active Alarm" button 902 and an "All Alarms" button 904 to filter respectively between active alarms (i.e., alarms that have not yet been resolved, either by a technician or other methods) and all alarms (i.e., alarms including both those that have and have not been resolved). User interface 900 is further shown to include multiple alarm attributes 906-914 that describe the characteristics of a particular alarm. For example, the alarm severity attribute 906 (e.g., "CRITICAL") may alert a technician to the extent of the system consequences of the fault and/or the degree of attention that should be paid to the fault. The alarm designation attribute 908 (e.g., "OUTDOOR AIR TEMP SENSOR FAILURE") may describe the type of system failure causing the alarm. The alarm occurrence timestamp attribute 910 (e.g., "5:48 PM 5/11/2017") may describe the time and date at which the fault was detected. The alarm clearance status attribute 912 may describe whether any action was taken and/or whether any condition occurred to resolve the issue causing the detected fault. Finally, the alarm history attribute 914 may include a drop down list or a hyperlink to a list detailing the history of the particular alarm (e.g., as characterized by alarm designation attribute 908). In some embodiments, alarm dashboard user interface 900 may include addition alarm attributes and/or may omit one or more of the alarm attributes 906-814. In other embodiments, one or more of alarm attributes 906-914 are configured as drop down lists, permitting a viewer of user interface 900 to toggle between the alarm details of multiple detected faults.

Alarm dashboard user interface 900 is also shown to include system parameters 916-924. For example, parameters 916-924 may include, but are not limited to, operational outdoor temperature 916, return air temperature 918, mixed air temperature 920, supply air temperature 922, and economizer damper % command 924. Each parameter may have an associated parameter field 926-934 which is configured to display the current value of each of the system parameters 916-924 as reported by various components (e.g., sensors, the devices themselves) of the HVAC system 100. In some embodiments, if the unit control board detects that the value reported by the system component and displayed in the parameter field 916-924 exceeds certain boundaries of reliable data (e.g., a sensor reporting an outdoor air temperature of 150° F., as shown in parameter field 926), user interface 900 may designate the parameter field as such with an "UNRELIABLE" tag 936. In some embodiments, tag 936 is a hyperlink, and clicking on the hyperlink opens a window or dialog box that explains why the value of the parameter was determined to be unreliable. For instance, in the example depicted in FIG. 8A, the dialog box may state that any outdoor air temperature parameter value outside the bounds of −20° F. to 110° F. is considered unreliable.

Still referring to FIG. 11A, each system parameter 916-924 and parameter field 926-934 may have an associated "View Trend" button 938-946 that permits a viewer of user interface 900 to access historical values of the parameter. Further details of the parameter history user interface are described below with reference to FIG. 11C. In some embodiments, the collection of system parameters 916-924, as well as their associated parameter fields 926-934 and historical parameter data accessed via buttons 938-946 may be referred to as a "fault causation template".

Figure 11B:
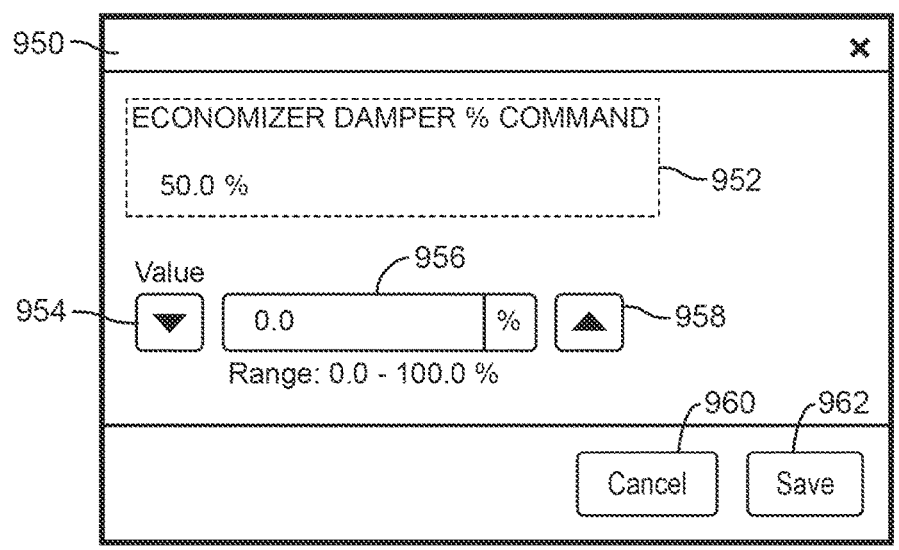
FIG. 11B is a diagram illustrating a parameter modification user interface that is accessible via the alarm dashboard user interface of FIG. 11A, according to some embodiments.

Turning now to FIG. 11B, a parameter modification user interface 950 that is accessible via the alarm dashboard user interface 900 is shown. In some embodiments, parameter modification user interface 950 is accessed by clicking on a button or a hyperlink associated with one of the parameter value fields 926-934, described above with reference to FIG. 11A. For example, as shown in FIG. 11B, parameter modification user interface 950 may be accessed by clicking on the hyperlink for the parameter value field 934 associated with the economizer damper % command parameter 924.

Parameter modification user interface 950 is shown to include a parameter display field 952, parameter value toggle buttons 954 and 958, and a parameter value field 956. As shown, the parameter display field 952 may include both the name of the parameter (e.g., "ECONOMIZER DAMPER % COMMAND") as well the current value of the parameter (e.g., "50.0%"). A user may modify the current value of the parameter by clicking on parameter value toggle buttons 954 and 958 to increase or decrease the parameter value. In some embodiments, parameter value field 956 may be configured to receive manual input from a user. In other embodiments, the range of acceptable values for the parameter may be listed under the parameter value field (e.g., "Range: 0.0-100.0%"). Parameter value field 956 may be configured to reject input from a user outside the acceptable range. For example, parameter value field 956 may reject a user attempt to enter a parameter value of 150.0%. Changes to the parameter value may be discarded via a "Cancel" button 960 or retained via a "Save" button 962. In various embodiments, buttons 960 and 962 may be configured to close parameter modification user interface 950 and return the user to alarm dashboard user interface 900.

Figure 11C:
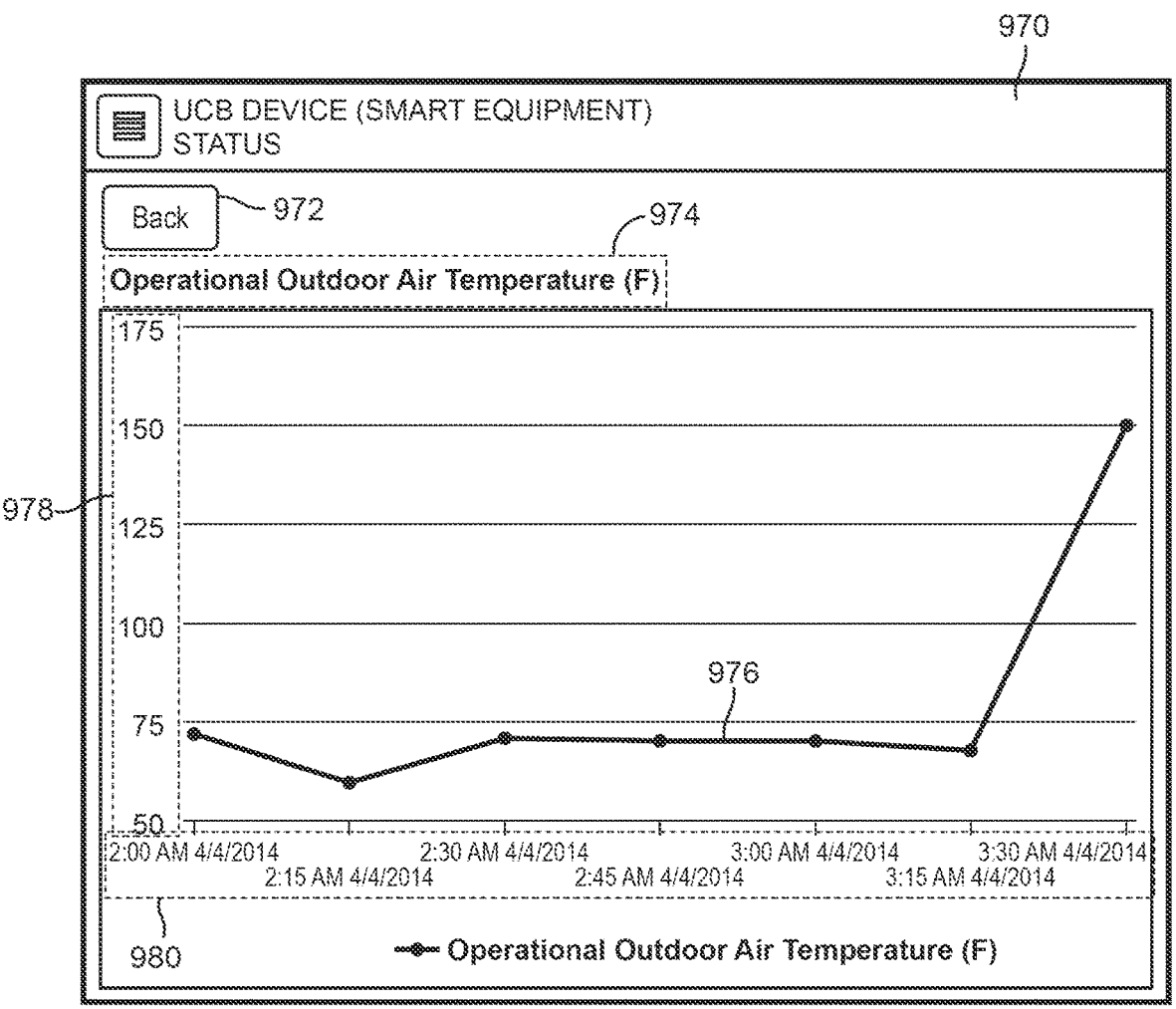
FIG. 11C is a diagram illustrating a parameter history user interface that is accessible via the alarm dashboard user interface of FIG. 11A, according to some embodiments.

Referring now to FIG. 11C, a parameter history user interface 970 that is accessible via the alarm dashboard user interface 900 is shown. In some embodiments, parameter history user interface 970 is accessed by clicking on a "View Trend" button or hyperlink associated with a parameter 916-924 (e.g., buttons 938-946). Parameter history user interface 970 is shown to include a "Back" button 972 that may be configured to close the parameter history user interface 970 and return the user to the alarm dashboard user interface 900. Parameter history user interface 970 is further shown to include parameter heading 974 (e.g., "Operational Outdoor Air Temperature (° F.)") and a parameter trendline 976 plotted along axes 978 and 980.

Axis 978 (i.e., the y-axis of the plot of trendline 976) may be any unit suitable for the selected parameter. For example, as depicted in FIG. 11C, axis 978 may be representative of the outdoor air temperature in degrees Fahrenheit. Axis 980 (i.e., the x-axis) represents a time unit. Both axes 978 and 980 may be any appropriate scale that permits a user to easily view and understand the parameter data. In some embodiments, parameter history user interface 970 may automatically scale axes 978 and 980. For example, the scale of axis 978 ranges from 50° F. to 175° F. Although an outdoor air temperature of 175° F. is not observable in nature, axis 978 may automatically expand in order to more easily view data points indicating a fault condition (e.g., the parameter data value of 150° F., which, as described above was tagged "UNRELIABLE" in alarm dashboard user interface 900 and may be due to a malfunctioning temperature sensor or other device). Similarly, the time parameter of axis 980 may automatically scale based on the characteristics of the displayed parameter. For example, although the fluctuations of operational outdoor air temperature parameter 916 may warrant temperature sensor data plotted in 15 minute intervals, other parameters may fluctuate less frequently, and axis 980 may be automatically scaled accordingly (e.g., parameter data may be plotted one every eight hours or even once every day).

Figure 12A:
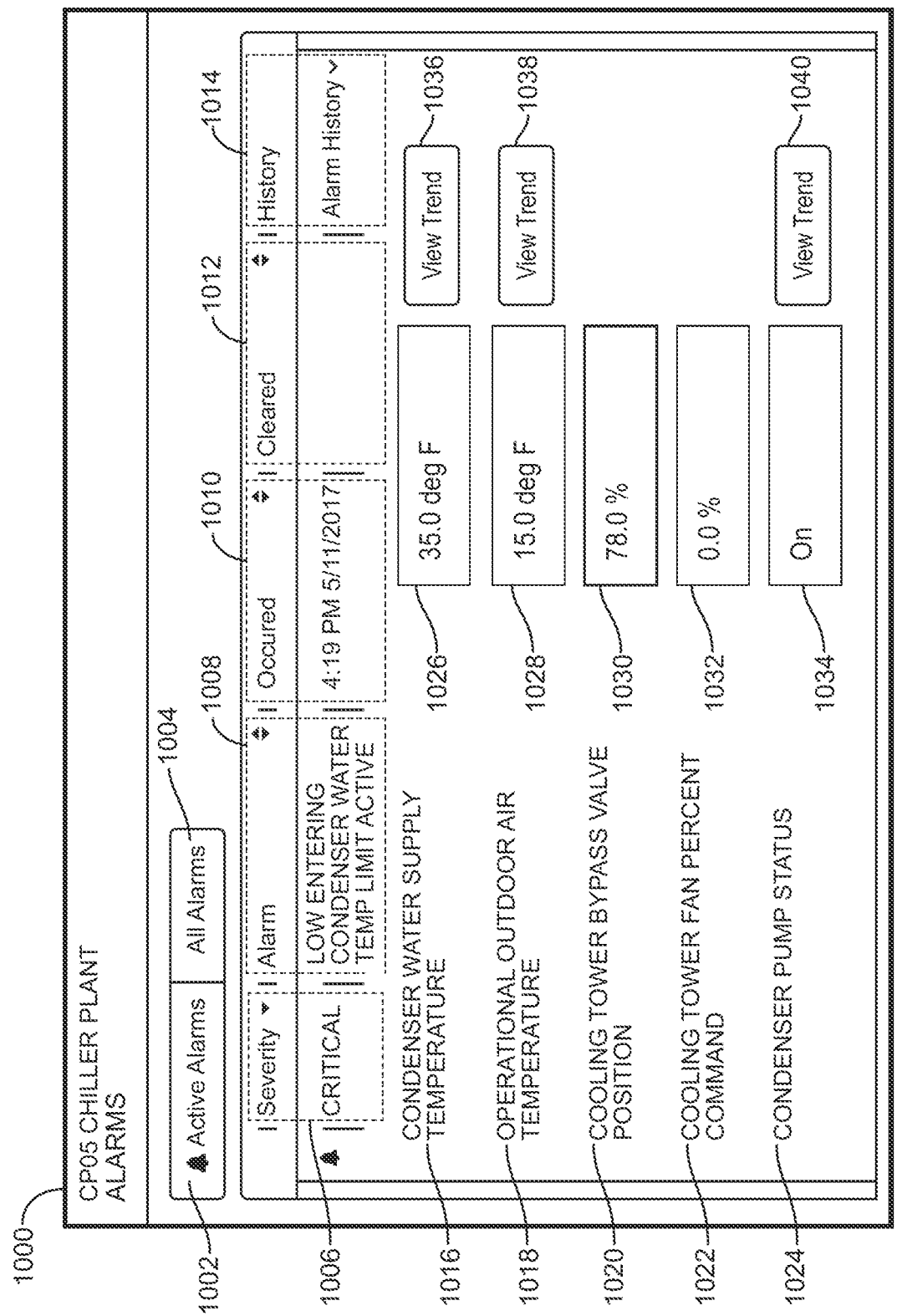
FIG. 12A is another diagram illustrating an alarm dashboard user interface that may be implemented in the BMS of FIG. 10, according to some embodiments.
Figure 12B:
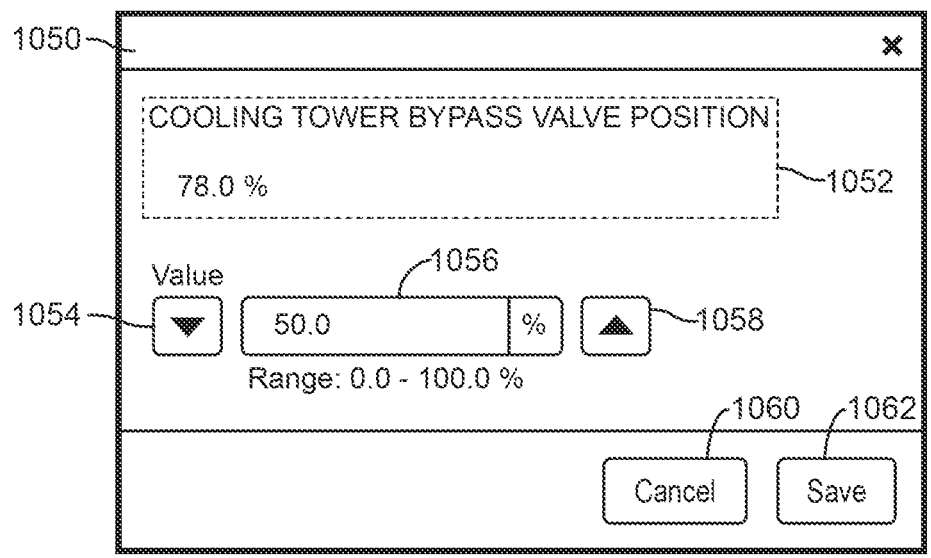
FIG. 12B is a diagram illustrating a parameter modification user interface that is accessible via the alarm dashboard user interface of FIG. 12A, according to some embodiments.
Figure 12C:
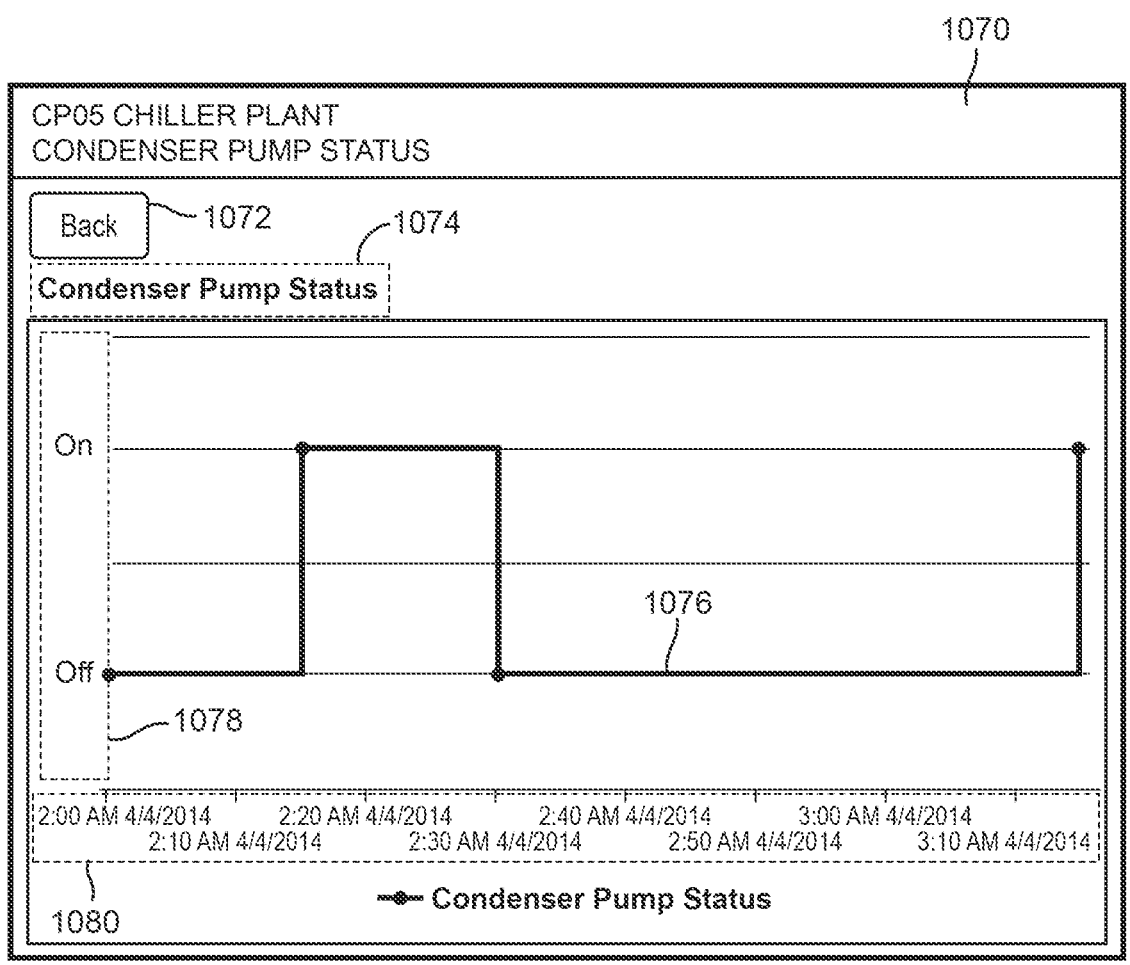
FIG. 12C is a diagram illustrating a parameter history user interface that is accessible via the alarm dashboard user interface of FIG. 12A, according to some embodiments.

Turning now to FIGS. 12A-12C, several alarm dashboard user interfaces 1000, 1050, and 1070 for a central plant optimization system are depicted. In various embodiments, alarm dashboard user interfaces 1000, 1050 and 1070 include components identical or substantially similar to alarm dashboard user interfaces 900, 950, and 970, described above with reference to FIGS. 11A-11C. For example, as depicted in FIG. 12A, alarm dashboard user interface 1000 is shown to include an "Active Alarm" button 1002 and an "All Alarms" button 1004 to filter between active alarms and all alarms, alarm attributes 1006-1014 that describe the characteristics of a particular alarm, and parameters 1016-1024 that are potentially related to the alarm. In contrast to parameters 916-924, parameters 1016-1024 may be specific to the devices within a central plant (e.g., CPOS 600, CPOS 700). For example, parameters 1016-1024 may include, but are not limited to, condenser water supply temperature 1016, operational outdoor air temperature 1018, cooling tower bypass valve position 1020, cooling tower fan percent command 1022, and condenser pump status 1024. Parameters 1016-1024, their associated parameter fields 1026-1034, and the historical parameter data accessed via buttons 1036-1040 may be collectively referred to as a "fault causation template." As described above with reference to causal relationship retriever module 816, parameters 1016-1024 may represent system parameters of devices potentially relevant to the identified fault and associated parameter fields 1026-1034 may be used to describe or quantify the operational state of the relevant devices.

FIG. 12B depicts a parameter modification user interface 1050 that is accessible via the alarm dashboard user interface 1000 of FIG. 12A. In some embodiments, parameter modification user interface 1050 includes components that are identical or substantially similar to parameter modification user interface 950, described above with reference to FIG. 11B. User interface 1050 is shown to include a parameter display field 1052 that indicates the current value of the parameter (e.g., "Cooling Tower Bypass Valve Position 78.0%"), as well as parameter value toggle buttons 1054 and 1058 and parameter value field 1056 to modify the value of the parameter. To close the parameter modification user interface 1050 and return to alarm dashboard user interface 1000, a user may click on "Cancel" button 1060 or "Save" button 1062 to respectively discard or save the changes to the parameter value.

Referring now to FIG. 12C, a parameter history user interface 1070 that is accessible via the alarm dashboard user interface 1000 of FIG. 12A is shown. In various embodiments, parameter history user interface 1070 is accessed by clicking on a "View Trend" button or hyperlink associated with parameter 1016, 1018, or 1024 (e.g., buttons 1036-1040). Parameter history user interface 1070 is shown to include a "Back" button 1072 configured to return the user to the alarm dashboard user interface 1000. Parameter history user interface 1070 is further shown to include parameter heading 1074 (e.g., "Condenser Pump Status") and a parameter trendline 1076 plotted along axes 1078 and 1080. In contrast to trendline 976, described above with reference to FIG. 11C, parameter trendline 1076 may represent binary data (i.e., the only possible parameter values of the condenser pump status are "On" or "Off").

Figure 13:
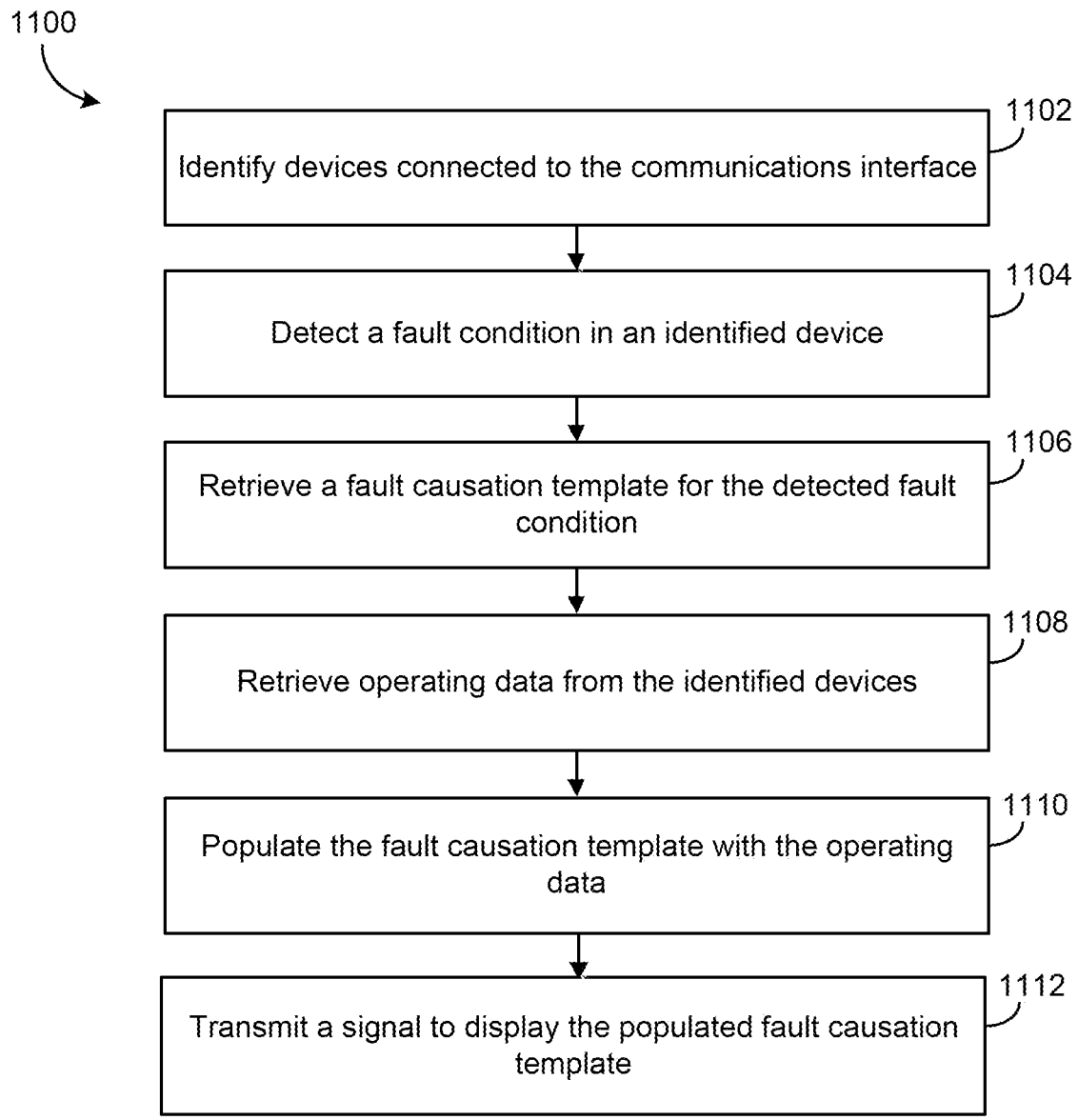
FIG. 13 is a flow diagram illustrating a process for creating the data driven user interfaces of FIGS. 11A-12C, according to some embodiments.

Turning now to FIG. 13, a flow diagram illustrating a process 1100 for creating a data driven user interface is shown. In some embodiments, process 1100 is performed by BMS controller 366 of BMS 400 or BMS device 802 of BMS 800. In other embodiments, process 1100 is performed by the processing circuit of a chiller device (e.g., chillers 602-608 of CPOS 600, chillers 702-708 of CPOS 700). For the purpose of simplicity, process 1100 will be described predominantly with reference to BMS 800. Process 1100 is shown to begin with step 1102, in which device identifier 810 identifies all HVAC devices connected to the communications interface 822. In various embodiments, the HVAC devices include, but are not limited to, air handling units (AHUs), variable air volume units (VAVs), rooftop units (RTUs), economizer-type AHUs, dampers, actuators, valves, pumps, and thermostats. Alternatively, if performed by the processing circuit of a chiller device, step 1102 may include discovery of additional chiller devices, cooling towers, chilled water pumps, condenser water pumps, and isolation valves.

At step 1104, fault detector 812 detects a fault condition in one of the devices connected to the communications interface 822. In various embodiments, examples of fault conditions occurring within the BMS 800 may include a malfunctioning, non-functioning, or non-communicative device, water/air flow rates outside operational limits, or water/air temperatures outside of operational limits. In some embodiments, step 1104 additionally includes state identifier 814 detecting an operating state (e.g., an alarm state, a heating state, a cooling state, a standby state) for each of the identified devices. Continuing with step 1106, causal relationship template retriever 816 retrieves a fault causation template for the detected fault condition. In various embodiments, the fault causation template includes all system parameters (e.g., parameters 1016-1024) that may be relevant to the fault condition. As used herein, "relevance" to the fault condition may include both parameters for devices and components within the BMS that may be the cause of the fault, as well as parameters for devices and components that may be damaged by the fault condition. For example, as depicted in FIG. 12A, if processing circuit 658 of chiller device 602 detects a low temperature condition in the water entering a condenser, processing circuit 658 may retrieve a fault condition template including system parameters for devices or components that may indicate the cause of the fault (e.g., condenser water supply temperature 1016, operational outdoor air temperature 1018), as well as system parameters for devices that may be damaged by the fault (e.g., condenser pump status 1024 may be included in the data model for the low temperature fault because excessively cold water may have a detrimental effect on the pump operation).

At step 1108, status requestor 818 retrieves historical operating data for the devices identified by device identifier 810. In some embodiments, step 1108 involves transmitting a query message requesting the historical operating data to devices connected to the communication interface 822. Upon receipt of the historical data in response to the query message, user interface (UI) generator 820 may populate the fault causation template with the operating data at step 1110. Finally, process 1100 concludes at step 1112, in which UI generator 820 transmits a signal to display the user interface containing the populated fault causation template on a display screen. In some embodiments, the user interface is displayed on an embedded chiller display screen (e.g., display panel 650 of chiller device 602). In other embodiments, the device performing process 1100 (e.g., BMS controller 366, BMS device 802, processing circuit 658) transmits a signal to display the user interface on a user computing device (e.g., a technician's mobile phone or laptop). In various embodiments, the user interface displaying the fault causation template for CPOS 600 may be the alarm dashboard user interface 1000, described above with reference to FIG. 12A. From the alarm dashboard user interface 1000, a user may modify system parameters via the parameter modification user interface 1050, or view historical data via the parameter history user interface 1070.

Although the user interfaces depicted in FIGS. 11A-12C and the method disclosed in FIG. 13 have been described exclusively with reference to an operational system experiencing an alarm or fault condition, according to the methods disclosed herein, substantially similar data models, user interfaces, and methods may be utilized in BMS 400, BMS 800, CPOS 600, or CPOS 700 for the purpose of commissioning a system in order to reach full operational status. For example, referring to BMS 800, device identifier 810 may send a query message in order to detect all devices communicating on the communications interface 822. In response to the query message, state identifier 814 may determine an operating state (e.g., a commissioning state, a standby state) of each of the identified devices and causal relationship template retriever module 816 may retrieve a template of system parameters related to the identified devices. UI generator 820 may then populate the system parameters of the template with suggested commissioning values and transmit a signal to display the template as a user interface on a chiller display panel or a user computing device. In this way, a user is able to navigate through and modify the system parameters of only those devices present in the system and communicating on the communications bus.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising one or more processors and one or more non-transitory computer-readable media storing instructions that, when executed by the one or more processors, cause the one or more processors to perform operations comprising:
   operating a plurality of HVAC devices to affect a physical state or condition;
   detecting a fault condition associated with the physical state or condition and having causal relationships with the plurality of HVAC devices such that faulty operation of one or more of the plurality of HVAC devices causes a detectable effect;
   providing, based on the fault condition, a fault causation template corresponding to the fault condition and comprising a plurality of system parameters of the plurality of HVAC devices, wherein the system parameters comprise a condenser water supply temperature, a valve position, and a tower fan percentage;
   retrieving operating data for the plurality of system parameters;

populating the fault causation template with the operating data; and providing a user interface comprising the fault causation template populated with the operating data on a display screen.

2. The BMS of claim 1, wherein the system parameters comprise an operating state of at least one of the plurality of HVAC devices, the operating state including at least one of an alarm state and a cooling state.

3. The BMS of claim 1, wherein the system parameters further comprise a condenser water return temperature.

4. The BMS of claim 1, wherein the system parameters further comprise a pump status and a pressure characteristic of a fluid provided at the pump.

5. The BMS of claim 1, wherein:
the fault causation template corresponding to the fault condition comprises points of the BMS that have time-varying values; and
retrieving operating data for the plurality of system parameters comprises retrieving a current value for each of the plurality of system parameters of the plurality of HVAC devices that are potential causes of the fault condition.

6. The BMS of claim 1, wherein the plurality of system parameters indicate a current operating state of at least one HVAC device of the plurality of HVAC devices and whether the at least one HVAC device of the plurality of HVAC devices is exhibiting faulty operation.

7. The BMS of claim 1, wherein the user interface comprising the fault causation template includes a selectable icon that opens a user interface page configured to display a measure of at least one system parameter of the system parameters associated with at least one HVAC device of the plurality of HVAC devices.

8. The BMS of claim 1, wherein the user interface comprising the fault causation template includes a selectable icon that opens a user interface page configured to display historical data associated with at least one system parameter of the system parameters.

9. A method for providing a fault causation template for a building management system, the method comprising:
operating a plurality of HVAC devices to affect a physical state or condition;
detecting a fault condition associated with the physical state or condition and having causal relationships with the plurality of HVAC devices such that faulty operation of one or more of the plurality of HVAC devices causes a detectable effect;
providing, based on the fault condition, a fault causation template corresponding to the fault condition and comprising a plurality of system parameters of the plurality of HVAC devices, wherein the system parameters comprise a condenser water supply temperature, a valve position, and a tower fan percentage;
retrieving operating data for the plurality of system parameters;
populating the fault causation template with the operating data; and
providing a user interface comprising the fault causation template populated with the operating data on a display screen.

10. The method of claim 9, wherein the system parameters comprise an operating state of at least one of the plurality of HVAC devices, the operating state including at least one of an alarm state and a cooling state.

11. The method of claim 9, wherein the system parameters further comprise a pump status and a pressure characteristic of a fluid provided at the pump.

12. The method of claim 9, wherein:
the fault causation template corresponding to the fault condition comprises points of the BMS that have time-varying values; and
retrieving operating data for the plurality of system parameters comprises retrieving a current value for each of the plurality of system parameters of the plurality of HVAC devices that are potential causes of the fault condition.

13. The method of claim 9, wherein the plurality of system parameters indicate a current operating state of at least one HVAC device of the plurality of HVAC devices and whether the at least one HVAC device of the plurality of HVAC devices is exhibiting faulty operation.

14. The method of claim 9, wherein the user interface comprising the fault causation template includes a selectable icon that opens a user interface page configured to display a measure of at least one system parameter of the system parameters associated with at least one HVAC device of the plurality of HVAC devices.

15. The method of claim 9, wherein the user interface comprising the fault causation template includes a selectable icon that opens a user interface page configured to display historical data associated with at least one system parameter of the system parameters.

16. One or more non-transitory computer-readable media storing instructions that, when executed by one or more processors, cause the one or more processors to perform operations comprising:
operating a plurality of HVAC devices to affect a physical state or condition;
detecting a fault condition associated with the physical state or condition and having causal relationships with the plurality of HVAC devices such that faulty operation of one or more of the plurality of HVAC devices causes a detectable effect;
providing, based on the fault condition, a fault causation template corresponding to the fault condition and comprising a plurality of system parameters of the plurality of HVAC devices, wherein the system parameters comprise a condenser water supply temperature, a valve position, and a tower fan percentage;
retrieving operating data for the plurality of system parameters;
populating the fault causation template with the operating data; and
providing a user interface comprising the fault causation template populated with the operating data on a display screen.

17. The non-transitory computer-readable media of claim 16, wherein the system parameters comprise an operating state of at least one of the plurality of HVAC devices, the operating state including at least one of an alarm state and a cooling state.

18. The non-transitory computer-readable media of claim 16, wherein
the fault causation template corresponding to the fault condition comprises points of the BMS that have time-varying values; and
retrieving operating data for the plurality of system parameters comprises retrieving a current value for each of the plurality of system parameters of the plurality of HVAC devices that are potential causes of the fault condition.

19. The non-transitory computer-readable media of claim 16, wherein the plurality of system parameters indicate a current operating state of at least one HVAC device of the plurality of HVAC devices and whether the at least one HVAC device of the plurality of HVAC devices is exhibiting faulty operation.

20. The non-transitory computer-readable media of claim 16, wherein the user interface comprising the fault causation template includes a selectable icon that opens a user interface page configured to display a measure of at least one system parameter of the system parameters associated with at least one HVAC device of the plurality of HVAC devices.

* * * * *